United States Patent
Kim et al.

(10) Patent No.: US 12,338,319 B2
(45) Date of Patent: Jun. 24, 2025

(54) RESIN COMPOSITION, NONWOVEN FABRIC AND FILM OF BIODEGRADABLE POLYESTER, AND PREPARATION METHOD THEREOF

(71) Applicant: SK leaveo Co., Ltd., Gyeonggi-do (KR)

(72) Inventors: Kyung Youn Kim, Gyeonggi-do (KR); Hyung Mo Kim, Gyeonggi-do (KR); Seong Dong Kim, Gyeonggi-do (KR); Hoon Kim, Gyeonggi-do (KR)

(73) Assignee: SK leaveo Co., Ltd., Gyeonggi-do (KR)

( * ) Notice: Subject to any disclaimer, the term of this patent is extended or adjusted under 35 U.S.C. 154(b) by 949 days.

(21) Appl. No.: 17/326,489

(22) Filed: May 21, 2021

(65) Prior Publication Data

US 2021/0380757 A1 Dec. 9, 2021

(30) Foreign Application Priority Data

| May 28, 2020 | (KR) | 10-2020-0064391 |
| May 28, 2020 | (KR) | 10-2020-0064393 |
| Jun. 24, 2020 | (KR) | 10-2020-0077305 |
| Jul. 31, 2020 | (KR) | 10-2020-0095851 |
| Nov. 11, 2020 | (KR) | 10-2020-0149832 |

(51) Int. Cl.
*C08G 63/181* (2006.01)
*C08J 5/18* (2006.01)
*C08L 67/02* (2006.01)
*D01D 5/08* (2006.01)

(52) U.S. Cl.
CPC ............ *C08G 63/181* (2013.01); *C08J 5/18* (2013.01); *C08L 67/02* (2013.01); *C08J 2367/02* (2013.01); *C08J 2401/02* (2013.01); *D01D 5/08* (2013.01); *D10B 2331/04* (2013.01); *D10B 2401/12* (2013.01)

(58) Field of Classification Search
CPC .................................................. C08G 63/183
See application file for complete search history.

(56) References Cited

U.S. PATENT DOCUMENTS

| 6,495,656 B1 | 12/2002 | Haile et al. |
| 2010/0233481 A1 | 9/2010 | Isogai et al. |
| 2011/0237750 A1 | 9/2011 | Ren et al. |
| 2012/0283363 A1 | 11/2012 | Kumamoto et al. |
| 2013/0018131 A1 | 1/2013 | Alidedeoglu et al. |
| 2015/0158974 A1 | 6/2015 | Chun et al. |
| 2016/0297962 A1* | 10/2016 | Nelson .............. C08J 3/005 |
| 2017/0129991 A1 | 5/2017 | Kim et al. |

FOREIGN PATENT DOCUMENTS

| EP | 3643750 A1 | 4/2020 |
| JP | 09-143253 A | 6/1997 |
| JP | 2008-266630 A | 11/2008 |
| JP | 2011-137093 A | 7/2011 |
| JP | 2014-181255 A | 9/2014 |
| JP | 2014-524959 A | 9/2014 |
| JP | 2015-524871 A | 8/2015 |
| JP | 2017-533282 A | 11/2017 |
| JP | 2020-050780 A | 4/2020 |
| KR | 10-2012-0103158 A | 9/2012 |
| KR | 10-2014-0031010 A | 3/2014 |
| KR | 10-2014-0103956 A | 8/2014 |
| KR | 10-2016-0079770 A | 7/2016 |
| KR | 10-2019-0066598 A | 6/2019 |
| KR | 10-1989045 B1 | 6/2019 |
| KR | 10-2019-0133296 A | 12/2019 |
| KR | 10-2058392 B1 | 12/2019 |
| WO | 2009/069641 A1 | 6/2009 |
| WO | 2011/071156 A1 | 6/2011 |
| WO | 2013/012706 A1 | 1/2013 |
| WO | 2018205559 A1 | 11/2018 |

OTHER PUBLICATIONS

Witt, U.; Einig, T.; Yamamoto, M.; Kleeburg, I.; Deckwer, W.-D.; Müller, R.-J. Chemosphere 2001, 44, 289. (Year: 2001).*
English machine translation of Li et al. (WO 2018/205559) (Year: 2018).*
Office Action issued by the Korean Patent Office of Korean Patent Application No. 10-2020-0064391 on Jul. 13, 2021.
Office Action issued by the Korean Patent Office of Korean Patent Application No. 10-2020-0064393 on Jul. 13, 2021.
Office Action issued by the Korean Intellectual Property Office on Nov. 30, 2021.
Extended European Search Report issued by the European Patent Office on Oct. 1, 2021.
Office Action issued by the Japanese Intellectual Property Office on Apr. 26, 2022.
Office Action issued by the Korean Patent Office on Jun. 10, 2021.
Office Action for the Korean Patent Application No. 10-2020-0149832 issued by the Korean Intellectual Property Office on Aug. 30, 2022.

* cited by examiner

Primary Examiner — Michael F Pepitone
(74) Attorney, Agent, or Firm — IP & T GROUP LLP

(57) ABSTRACT

The embodiments relate to a biodegradable polyester resin composition, to a nonwoven fabric, to a film, and to processes for preparing the same in which the biodegradable polyester resin composition comprises a specific diol component and a specific dicarboxylic acid component and may further comprise nanocellulose, whereby the biodegradability, flexibility, strength, and processability are enhanced. Since the biodegradable polyester resin composition has enhanced biodegradability, flexibility, strength, and processability as compared with the conventional natural biodegradable polymer widely used, it can be applied to various fields such as films, packaging materials, and nonwoven fabrics to show excellent characteristics.

11 Claims, 4 Drawing Sheets

[Fig. 1]
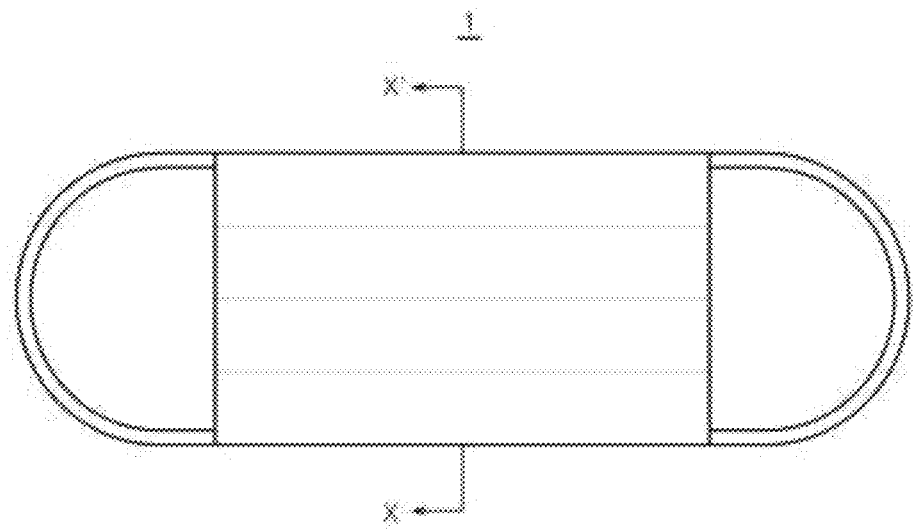
[Fig. 2]
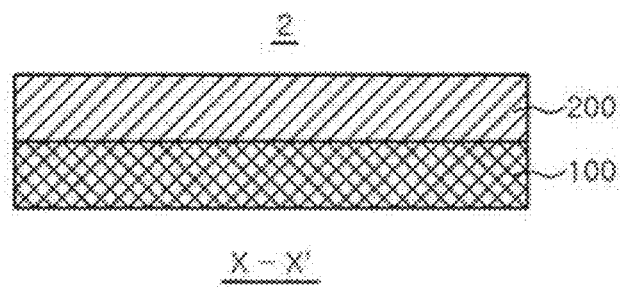
[Fig. 3]
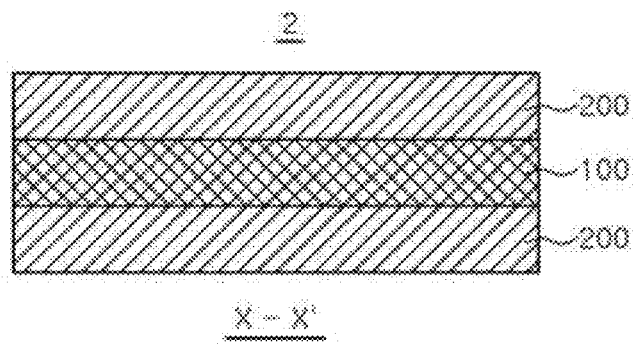

[Fig. 4]
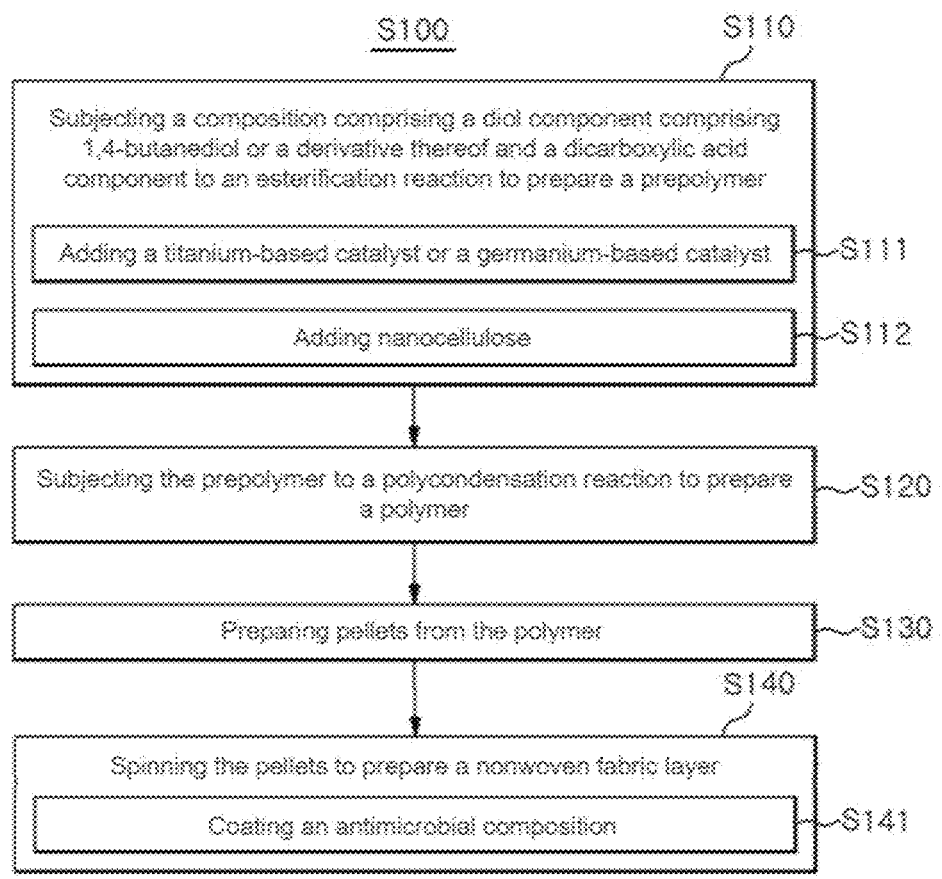

[Fig. 5]
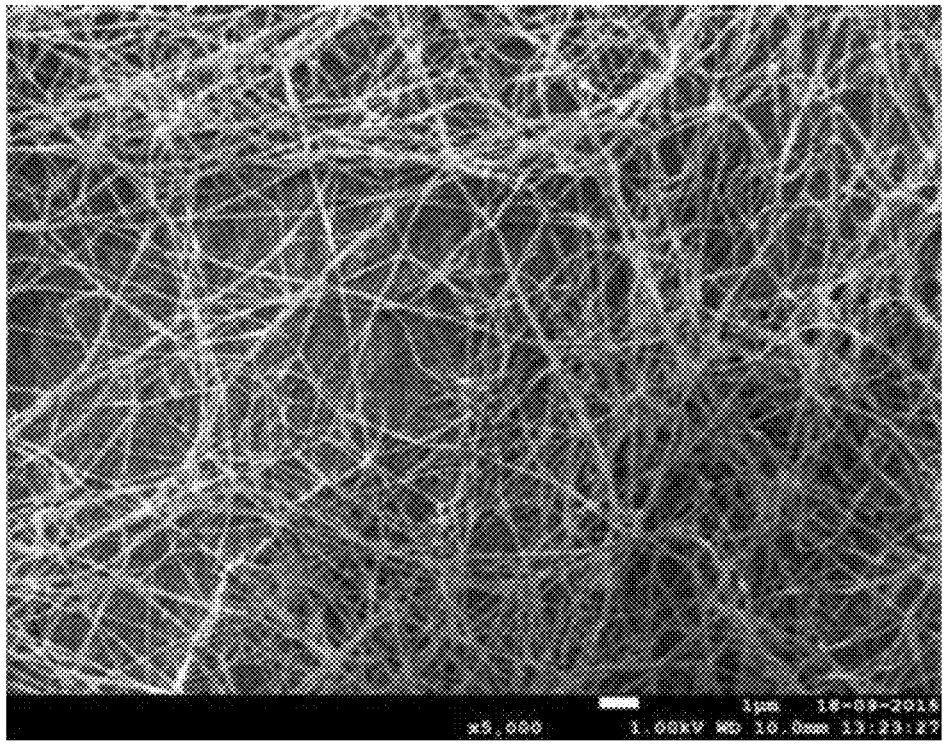
[Fig. 6]
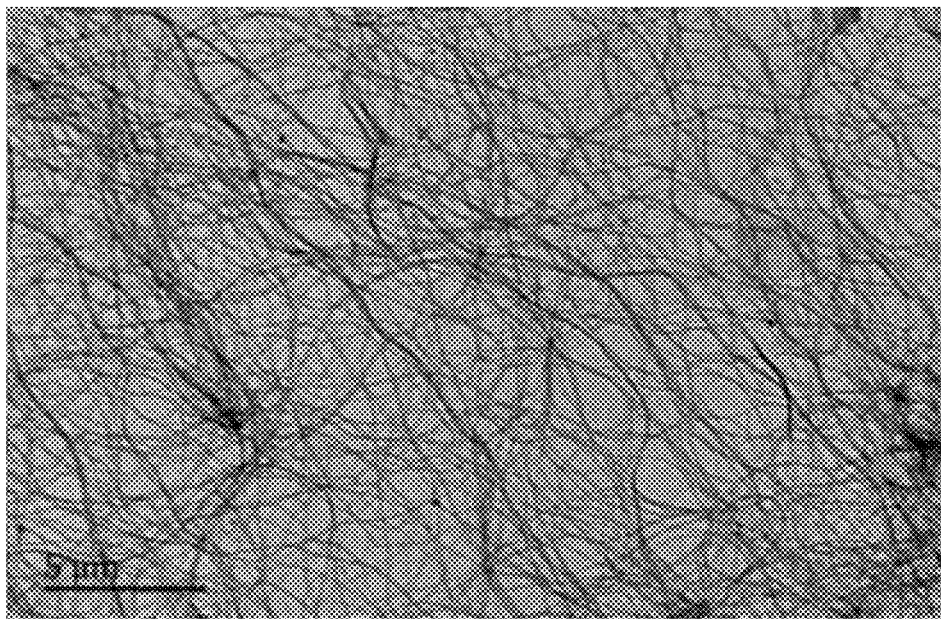

[Fig. 7]
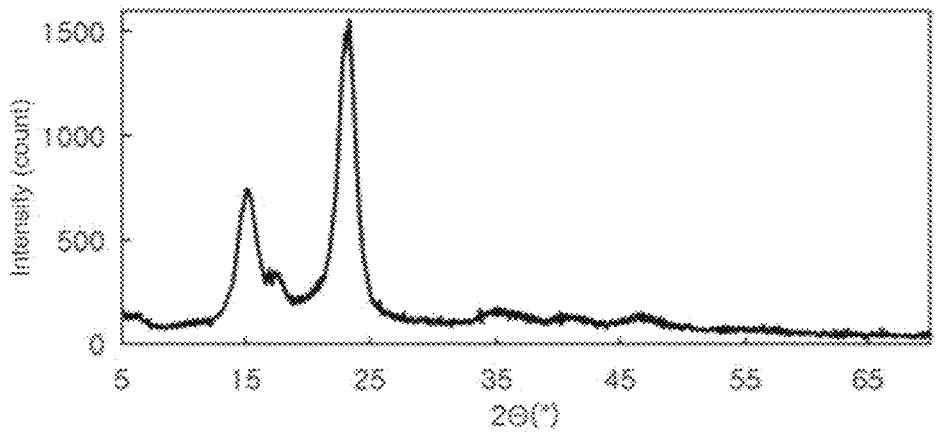
[Fig. 8]
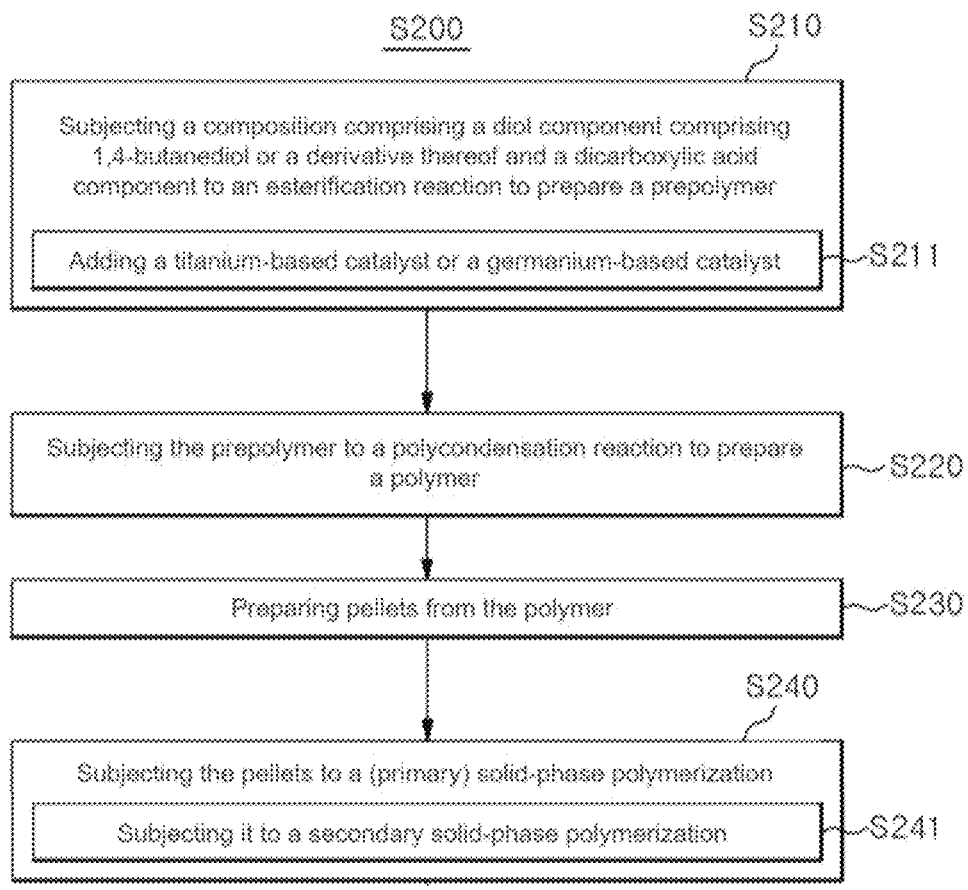

RESIN COMPOSITION, NONWOVEN FABRIC AND FILM OF BIODEGRADABLE POLYESTER, AND PREPARATION METHOD THEREOF

The present application claims priority of Korean patent application number 10-2020-0064391 filed on May 28, 2020, Korean patent application number 10-2020-0064393 filed on May 28, 2020, Korean patent application number 10-2020-0077305 filed on Jun. 24, 2020, Korean patent application number 10-2020-0095851 filed on Jul. 31, 2020 and Korean patent application number 10-2020-0149832 filed on Nov. 11, 2020. The disclosure of each of the foregoing applications is incorporated herein by reference in its entirety.

TECHNICAL FIELD

Embodiments relate to a biodegradable polyester resin composition, to a biodegradable nonwoven fabric, to a biodegradable polyester film, and to processes for preparing the same. In addition, the embodiments relate to a process for preparing a biodegradable polyester resin and to a biodegradable polyester resin.

BACKGROUND ART

In recent years, as concerns about environmental issues have increased, there is a need for a solution to the problem of dealing with various household products, in particular, disposable products. Specifically, since polymeric materials are inexpensive and excellent in such characteristics as processability, they are widely used to manufacture various products such as films, fibers, packaging materials, bottles, containers, and the like; however, they have disadvantages in that when the lifespan of a used product is over, harmful substances are discharged if it is incinerated and that it takes hundreds of years to be completely decomposed naturally depending on the type thereof.

In order to overcome the limitations of these polymers, studies on biodegradable polymers that can be decomposed in a much faster time are being actively conducted. Polylactic acid (PLA) is a natural biodegradable polymer and is derived from plant biomass resources, so that it can be easily obtained and has been widely used; however, its use is limited due to such physical limitations as low thermal resistance temperature and low moldability along with a slow biodegradation rate.

In particular, nonwoven fabrics are those made into a felt shape by arranging fibers in parallel or in random directions, without going through a weaving process, and bonding them with a synthetic resin adhesive. In recent years, they are widely used for disposable tissues, dishcloths, packaging materials, masks, and the like. When a nonwoven fabric is prepared from polylactic acid, it is stiff and low in flexibility, so that the texture or wearing comfort is very poor.

As an example, Korean Laid-open Patent Publication No. 2016-0079770 discloses a nonwoven fabric with improved flexibility, which is prepared by spinning a blend of polylactic acid and polypropylene. But polylactic acid and polypropylene are poorly compatible with each other, resulting in low processability and poor quality of nonwoven fabrics possibly with dent defects such as fisheyes.

In addition, although polybutyleneadipate terephthalate (PBAT) and polybutylene succinate (PBS) are used as biodegradable polymers in addition to polylactic acid, their use is limited due to poor mechanical properties such as strength.

In order to overcome these physical limitations, a method of blending biodegradable polymers or adding an impact strength enhancer, a chain extender, or a nano-filler has been attempted. However, the extent of improvement in physical properties through this method is not significant. In particular, since it is difficult to uniformly disperse a nano-filler, there may be variations from part to part. In addition, these additives are not biodegradable and may reduce the transparency of products manufactured using them. Thus, there is a need for research on biodegradable polymers having physical properties that can be applied to various fields.

As an example, Korean Laid-open Patent Publication No. 2012-0103158 discloses a biodegradable plastic composition having improved durability in which polypropylene carbonate (PPC) is blended with a composition comprising PLA, PBS, and the like. The method based on such blending has limitations in enhancing durability or transparency.

In addition, polybutylene succinate adipate (PBSA), polybutylene succinate butylene terephthalate (PBST), and the like are widely used as biodegradable polymers in addition to PLA, PBAT, and PBS described above. However, these aliphatic or aliphatic-aromatic polyester resins have low hydrolysis resistance due to an increase in the concentration of carboxyl end groups formed by side reactions taking place in the polymerization reaction. Thus, products prepared from such aliphatic or aliphatic-aromatic polyester resins have a problem of discoloration or deterioration in lifespan and durability.

In order to solve this problem, a method of adding a deactivator or a chain extender has been attempted. However, the method of adding a deactivator or a chain extender has a long process time and has a limit to enhancing the hydrolysis resistance since the molecular weight of the polymer and the concentration of carboxyl end groups cannot be efficiently controlled.

As an example, Korean Laid-open Patent Publication No. 2012-0103158 discloses a biodegradable aliphatic-aromatic polyester resin to which a chain extender and a hydrolysis stabilizer are added. However, it is difficult to obtain a resin having a desired molecular weight and a concentration of carboxyl end groups through the method of adding such a chain extender and a hydrolysis stabilizer.

PRIOR ART DOCUMENT (Patent Document 1) Korean Laid-open Patent Publication No. 2016-0079770
(Patent Document 2) Korean Laid-open Patent Publication No. 2012-0103158
(Patent Document 3) Korean Laid-open Patent Publication No. 2014-0103956

DISCLOSURE OF INVENTION

Technical Problem

Accordingly, an object of the embodiments is to provide a biodegradable polyester resin composition, a biodegradable nonwoven fabric, a biodegradable polyester film, and a process for preparing the same, which can enhance the biodegradability, flexibility, strength, transparency, durability, and processability.

Another object of the embodiments is to provide a process for preparing a biodegradable polyester resin excellent in biodegradability, hydrolysis resistance, lifespan, strength, durability, and processability and a biodegradable polyester resin prepared thereby.

Still another object of the embodiments is to provide nanocellulose that is employed in a biodegradable polyester resin composition and has excellent dispersibility and light transmittance.

Solution to Problem

According to an embodiment, there is provided a biodegradable polyester resin composition, which comprises a diol component comprising 1,4-butanediol or a derivative thereof and a dicarboxylic acid component, wherein the dicarboxylic acid component comprises one or more selected from the group consisting of terephthalic acid, dimethyl terephthalic acid, adipic acid, succinic acid, and derivatives thereof. Specifically, the dicarboxylic acid component comprises a first dicarboxylic acid and a second dicarboxylic acid different from the first dicarboxylic acid, wherein the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof. Specifically, the molar ratio of the diol component and the dicarboxylic acid component is 1 to 2:1, the molar ratio of the first dicarboxylic acid and the second dicarboxylic acid is 0.5 to 2:1, and the biodegradable polyester resin composition has a biodegradability of 85% or more.

According to another embodiment, the biodegradable polyester resin composition further comprises one or more nanocellulose.

According to still another embodiment, there is provided a biodegradable polyester nonwoven fabric or film comprising the biodegradable polyester resin composition.

According to still another embodiment, there is provided a process for preparing a biodegradable polyester resin, which comprises subjecting a composition comprising a diol component comprising 1,4-butanediol or a derivative thereof and a dicarboxylic acid component to an esterification reaction to prepare a prepolymer; subjecting the prepolymer to a polycondensation reaction to prepare a polymer; and preparing pellets from the polymer. Specifically, the composition for preparing the biodegradable polyester resin further comprises nanocellulose in an amount of 3% by weight or less.

According to still another embodiment, there is provided a process for preparing a biodegradable polyester resin, which further comprises subjecting the pellets of the biodegradable polyester resin to a solid-phase polymerization. Specifically, the solid-phase polymerization is carried out at a temperature range from the glass transition temperature (Tg) to the melting point (Tm) or carried out at 80° C. to 150° C. and 3 Torr or less under a nitrogen atmosphere for 3 hours to 20 hours.

According to still another embodiment, there is provided a biodegradable polyester resin prepared according to the process for preparing a biodegradable polyester resin.

According to still another embodiment, there is provided a process for preparing a biodegradable polyester nonwoven fabric or film, which further comprises melt-extruding and spinning the pellets to prepare a nonwoven fabric layer or melt-extruding the pellets to prepare a blown film. Specifically, the process comprises preparing a composition comprising a diol component comprising 1,4-butanediol or a derivative thereof, a dicarboxylic acid component, and nanocellulose in an amount of 3% by weight or less based on the total weight of the composition; subjecting the composition to an esterification reaction to prepare a prepolymer; subjecting the prepolymer to a polycondensation reaction to prepare a polymer; preparing pellets from the polymer; and melt-extruding and spinning the pellets to prepare a nonwoven fabric layer or melt-extruding the pellets to prepare a blown film, wherein the dicarboxylic acid component comprises a first dicarboxylic acid and a second dicarboxylic acid different from the first dicarboxylic acid, the first dicarboxylic acid comprises one or more selected from the group consisting of terephthalic acid, dimethyl terephthalic acid, and derivatives thereof, the second dicarboxylic acid comprises one or more selected from the group consisting of adipic acid, succinic acid, and derivatives thereof, and the nonwoven fabric layer or the film has a tensile strength of 25 MPa or more and an elongation of 400% or more.

Advantageous Effects of Invention

As the biodegradable polyester resin composition according to the embodiment comprises a specific diol component and a specific dicarboxylic acid component, it is possible to enhance the strength, processability, and flexibility without impairing the biodegradability. Thus, it can be applied to various fields and exhibit excellent characteristics.

Accordingly, a biodegradable polyester nonwoven fabric comprising a nonwoven fabric layer formed therefrom has good texture or wearing comfort and is excellent in quality since it has almost no defects such as fisheyes. Thus, it can be readily applied to various products such as packaging materials, masks, and dishcloths.

In addition, as the biodegradable polyester resin composition according to the embodiment further comprises bacterial cellulose, nanocellulose pretreated with a silane coupling agent, or nanocellulose having a rate of change in light transmittance of 25% or less, it is possible to further enhance the transparency, dispersibility, biocompatibility, and hydrolysis resistance.

Accordingly, a biodegradable polyester film formed therefrom has excellent quality when applied to medical devices or packaging materials and has excellent quality applicable to packaging materials for products stored and transported at low temperatures, automotive interior materials that require durability, garbage bags, mulching films, and disposable products.

BRIEF DESCRIPTION OF DRAWINGS

FIG. 1 shows a mask prepared using a biodegradable nonwoven fabric according to an embodiment.

FIG. 2 shows an example of a cross-sectional view of the mask of FIG. 1 taken along X-X'.

FIG. 3 shows another example of a cross-sectional view of the mask of FIG. 1 taken along X-X'.

FIG. 4 shows a process of preparing a biodegradable nonwoven fabric according to an embodiment.

FIG. 5 shows a transmission electron microscope (TEM) image of bacterial cellulose.

FIG. 6 shows a scanning electron microscopy (SEM) image of bacterial cellulose.

FIG. 7 shows an X-ray diffraction (XRD) spectrum of bacterial cellulose.

FIG. 8 shows the process of preparing a biodegradable polyester resin according to an embodiment.

EXPLANATION OF REFERENCE NUMERALS

1: mask, 2: biodegradable nonwoven fabric, 100: nonwoven fabric layer, 200: antimicrobial coating layer

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

Throughout the present specification, the terms first, second, and the like are used to describe various components. But the components should not be limited by the terms. The terms are used only for the purpose of distinguishing one component from another.

For the sake of description, the sizes of individual elements in the appended drawings may be exaggeratedly depicted, and they may differ from the actual sizes.

Biodegradable Polyester Resin Composition

The biodegradable polyester resin composition according to an embodiment comprises a diol component comprising 1,4-butanediol or a derivative thereof and a dicarboxylic acid component, wherein the dicarboxylic acid component comprises a first dicarboxylic acid and a second dicarboxylic acid different from the first dicarboxylic acid, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof.

The biodegradable polyester resin composition according to another embodiment comprises a diol component comprising 1,4-butanediol or a derivative thereof; a dicarboxylic acid component comprising a first dicarboxylic acid and a second dicarboxylic acid different from the first dicarboxylic acid; and bacterial cellulose in a three-dimensional network structure with a diameter of 100 nm or less, wherein the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof.

The biodegradable polyester resin composition according to still another embodiment comprises a diol component comprising 1,4-butanediol or a derivative thereof; a dicarboxylic acid component comprising a first dicarboxylic acid and a second dicarboxylic acid different from the first dicarboxylic acid; and nanocellulose pretreated with a silane coupling agent represented by the following Formula 1, wherein the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof.

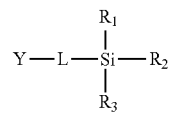

[Formula 1]

In Formula 1, Y is an organic functional group, L is an alkylene group or an arylene group, $R_1$ is an alkyl group, and $R_2$ and $R_3$ are each independently a hydrolyzable group.

The biodegradable polyester resin composition according to still another embodiment comprises a diol component comprising 1,4-butanediol or a derivative thereof; a dicarboxylic acid component; and nanocellulose having a rate of change in light transmittance of 25% or less according to Equation 1, wherein the dicarboxylic acid component comprises one or more selected from the group consisting of terephthalic acid, dimethyl terephthalic acid, adipic acid, succinic acid, and derivatives thereof, specifically, the dicarboxylic acid component comprises a first dicarboxylic acid and a second dicarboxylic acid different from the first dicarboxylic acid, wherein the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof.

$$\text{Rate of change in light transmittance (\%)} = \frac{|LT1 - LT2|}{LT1} \times 100 \quad [\text{Equation 1}]$$

In Equation 1, LT1 is a first light transmittance (%) of an aqueous dispersion in which the nanocellulose is dispersed in an amount of 0.1% by weight to 5% by weight, when measured under the conditions of a temperature of 30° C. and a wavelength of 850 nm, and LT2 is a second light transmittance (%) measured after 12 hours under the same conditions.

Diol and Dicarboxylic Acid Components

The diol component comprises 1,4-butanediol or a derivative thereof.

Specifically, the diol component may comprise 1,4-butanediol or a derivative thereof in an amount of 95% by mole or more, 97% by mole or more, 98% by mole or more, 99% by mole or more, or 100% by mole, based on the total number of moles of the diol component. As the diol component comprises 1,4-butanediol or a derivative thereof, it is possible to enhance the biodegradability, flexibility, and strength. In particular, if the diol component is composed of 1,4-butanediol only, it is possible to maximize the biodegradability, flexibility, and strength.

If necessary, the diol component may further comprise a second diol different from the first diol, which is 1,4-butanediol or a derivative thereof.

The second diol may be one or more selected from the group consisting of propanediol, hexanediol, cyclohexanedimethanol, and ethylene glycol. Specifically, the second diol may be one or more selected from the group consisting of 1,3-propanediol, 1,2-propanediol, 1,2-hexanediol, 1,3-hexanediol, 1,4-hexanediol, 1,6-hexanediol, 2,3-hexanediol, 2,4-hexanediol, 2,5-hexanediol, 2,6-hexanediol, 3,4-hexanediol, 1,2-cyclohexanedimethanol, 1,3-cyclohexanedimethanol, 1,4-cyclohexanedimethanol, and ethylene glycol.

The diol component may comprise the second diol in an amount of 5% by mole or less, 3% by mole or less, 2% by mole or less, or 1% by mole or less, based on the total number of moles of the diol component.

The dicarboxylic acid component comprises one or more selected from the group consisting of terephthalic acid, dimethyl terephthalic acid, adipic acid, succinic acid, and derivatives thereof.

Specifically, the dicarboxylic acid component may comprise one or more selected from the group consisting of terephthalic acid, dimethyl terephthalic acid, adipic acid, succinic acid, and derivatives thereof in an amount of 15% by mole or more, 30% by mole or more, 45% by mole or more, 50% by mole or more, 75% by mole or more, 90% by mole or more, 95% by mole or more, or 100% by mole, or 15% by mole to 80% by mole, 30% by mole to 60% by mole, 45% by mole to 55% by mole, 45% by mole to 100% by mole, 60% by mole to 95% by mole, 75% by mole to 100% by mole, or 85% by mole to 100% by mole, based on the total number of moles of the dicarboxylic acid component. For example, the dicarboxylic acid component may comprise adipic acid or succinic acid in an amount of 45% by mole or more, 50% by mole or more, 75% by mole or more, 90% by mole or more, 95% by mole or more, or 100% by mole.

The molar ratio of the diol component and the dicarboxylic acid component may be 0.5 to 2:1. For example, it may be 0.5 to 1.8:1, 0.7 to 1.8:1, or 0.9 to 1.6:1. According to an embodiment, the molar ratio of the diol component and the dicarboxylic acid component may be 1 to 2:1. Specifically, the molar ratio of the diol component and the dicarboxylic acid component may be 1 to 1.8:1, 1.1 to 1.8:1, 1.2 to 1.7:1, 1.3 to 1.6:1, or 1.2 to 1.5:1. As the molar ratio of the diol component and the dicarboxylic acid component satisfies the above range, it is possible to further enhance the biodegradability, strength, and processability without discoloration such as yellowing.

The dicarboxylic acid component may comprise a first dicarboxylic acid and a second dicarboxylic acid different from the first dicarboxylic acid.

The first dicarboxylic acid comprises one or more selected from the group consisting of terephthalic acid, dimethyl terephthalic acid, and derivatives thereof. Specifically, the first dicarboxylic acid may be terephthalic acid or dimethyl terephthalic acid.

In addition, the dicarboxylic acid component may comprise the first dicarboxylic acid in an amount of 15% by mole or more, 30% by mole or more, 45% by mole or more, 50% by mole or more, 55% by mole or more, 60% by mole or more, 70% by mole or more, 15% by mole to 80% by mole, 30% by mole to 60% by mole, 45% by mole to 55% by mole, 30% by mole to 90% by mole, 35% by mole to 80% by mole, 40% by mole to 75% by mole, 45% by mole to 80% by mole, 45% by mole to 75% by mole, 45% by mole to 70% by mole, or 50% by mole to 70% by mole, based on the total number of moles of the dicarboxylic acid component.

The second dicarboxylic acid comprises one or more selected from the group consisting of adipic acid, succinic acid, and derivatives thereof. Specifically, the second dicarboxylic acid may be adipic acid or succinic acid.

The dicarboxylic acid component may comprise the second dicarboxylic acid in an amount of 15% by mole or more, 30% by mole or more, 45% by mole or more, 50% by mole or more, 55% by mole or more, 60% by mole or more, 70% by mole or more, 15% by mole to 80% by mole, 30% by mole to 60% by mole, 45% by mole to 55% by mole, 30% by mole to 90% by mole, 35% by mole to 80% by mole, 40% by mole to 75% by mole, 45% by mole to 80% by mole, 45% by mole to 75% by mole, 45% by mole to 70% by mole, or 50% by mole to 70% by mole, based on the total number of moles of the dicarboxylic acid component.

The molar ratio of the first dicarboxylic acid and the second dicarboxylic acid may be 0.5 to 2:1. For example, the molar ratio of the first dicarboxylic acid and the second dicarboxylic acid may be 0.5 to 1.5:1, 0.7 to 1.3:1, or 0.8 to 1.2:1. As the molar ratio of the first dicarboxylic acid and the second dicarboxylic acid satisfies the above range, it is possible to further enhance the biodegradability and processability.

As described above, as the biodegradable polyester resin composition according to the embodiment comprises a specific diol component and a specific dicarboxylic acid component, it is possible to enhance the strength, processability, and flexibility without impairing the biodegradability. Thus, it can be applied to various fields and exhibit excellent characteristics.

Characteristics of the Composition

The biodegradable polyester resin composition has a biodegradability of 85% or more. For example, the biodegradability of the biodegradable polyester resin composition may be 90% or more or 95% or more. The biodegradability may be calculated by measuring the amount of carbon dioxide generated according to KS M3100-1. Specifically, an inoculum container having compost only and a test container in which a sample in 5% by weight of the dry weight of the compost has been added are prepared. They are cultivated for 180 days under the conditions of a temperature of 58±2° C., a moisture content of 50%, and an oxygen concentration of 6% or more. The amount of carbon dioxide generated in each container is measured to calculate the biodegradability according to the following equation.

Biodegradability (%)={(amount of $CO_2$ generated in the test container)−(amount of $CO_2$ generated in the inoculum container)}/(theoretical amount of $CO_2$ to be generated in the test container)×100

In addition, the biodegradable polyester resin composition may have a tensile strength of 25 MPa or more when it is melt-extruded at 160° C. to 240° C., processed at a rate of 50 m/min to form a blown film having a thickness of 20 μm, and measured at a speed of 100 mm/min in accordance with ASTM D882, or it may have a tensile strength of 25 MPa or more when it is melt-extruded at 220° C., spun at a rate of 50 m/min to form a nonwoven film having a thickness of 0.2 mm, and measured at a speed of 100 mm/min in accordance with ASTM D882. For example, the tensile strength may be 25 MPa or more, 30 MPa or more, 35 MPa or more, 40 MPa or more, 45 MPa or more, or 48 MPa or more, specifically, 25 MPa to 70 MPa, 30 MPa to 70 MPa, 35 MPa to 70 MPa, 25 MPa to 65 MPa, 30 MPa to 65 MPa, 35 MPa to 65 MPa, 25 MPa to 60 MPa, 30 MPa to 60 MPa, or 35 MPa to 60 MPa.

In addition, the biodegradable polyester resin composition may have an elongation of 400% or more when it is melt-extruded at 160° C. to 240° C., processed at a rate of 50 m/min to form a blown film having a thickness of 20 μm, and measured at a speed of 500 mm/min in accordance with ASTM D882, or it may have an elongation of 400% or more when it is melt-extruded at 220° C., spun at a rate of 50 m/min to form a nonwoven film having a thickness of 0.2 mm, and measured at a speed of 500 mm/min in accordance with ASTM D882. For example, the elongation may be 400% or more, 500% or more, or 600% or more, and 1,500% or less, 1,300% or less, or 1,200% or less, specifically, 400% to 1,500%, 400% to 1,300%, 400% to 1,200%, 500% to 1,500%, 500% to 1,400%, or 500% to 1,200%.

In addition, the biodegradable polyester resin composition may have a tear strength of 300 N/cm or more when it is melt-extruded at 160° C. to 240° C., processed at a rate of 50 m/min to form a blown film having a thickness of 20 μm, and measured at a speed of 500 mm/min in accordance with KPS M 1001-0806, or it may have a tear strength of 300 N/cm or more when it is melt-extruded at 220° C., spun at a rate of 50 m/min to form a nonwoven film having a thickness of 0.2 mm, and measured at a speed of 500 mm/min in accordance with KPS M 1001-0806. For example, the tear strength may be 300 N/cm or more, 400 N/cm or more, or 500 N/cm or more, and 1,800 N/cm or less, 1,500 N/cm or less, or 1,300 N/cm or less, specifically, 500 N/cm to 1,800 N/cm, 700 N/cm to 1,800 N/cm, 700 N/cm to 1,500 N/cm, or 500 N/cm to 1,300 N/cm.

Nanocellulose

The biodegradable polyester resin composition may further comprise nanocellulose. Specifically, the biodegradable polyester resin composition may comprise one or more nanocellulose selected from the group consisting of cellulose nanocrystals, cellulose nanofibers, and microfibrillated cellulose. Cellulose nanocrystals or cellulose nanofibers are preferred from the viewpoint of strength and thermal characteristics. As the biodegradable polyester resin composition further comprises the nanocellulose, the biodegradability, strength, and thermal characteristics can be further enhanced.

More specifically, the nanocellulose may be one or more selected from the group consisting of hydroxymethyl cellulose, hydroxyethyl cellulose, hydroxypropyl cellulose, hydroxypropylmethyl cellulose, cellulose acetate, methyl cellulose, ethyl cellulose, propyl cellulose, butyl cellulose, pentyl cellulose, hexyl cellulose, and cyclohexyl cellulose.

The nanocellulose may have a diameter of 1 nm to 100 nm. For example, the diameter of the nanocellulose may be 1 nm to 95 nm, 5 nm to 90 nm, 10 nm to 80 nm, 1 nm to 50 nm, 5 nm to 45 nm, 10 nm to 60 nm, 1 nm to 10 nm, 10 nm to 30 nm, or 15 nm to 50 nm.

In addition, the nanocellulose may have a length of 5 nm to 10 μm. For example, the length of the nanocellulose may be 5 nm to 1 μm, 10 nm to 150 nm, 20 nm to 300 nm, 200 nm to 500 nm, 100 nm to 10 μm, 500 nm to 5 μm, 300 nm to 1 μm, or 1 μm to 10 μm.

As the diameter and length of the nanocellulose satisfy the above ranges, the strength, in particular, tear strength can be further enhanced.

In addition, the content of the nanocellulose may be 0.001% by weight or more, 0.005% by weight or more, 0.01% by weight or more, or 0.1% by weight or more, and 3% by weight or less, 2% by weight or less, 1.8% by weight or less, or 1.2% by weight or less, based on the total weight of the composition. Specifically, the nanocellulose may be employed in an amount of 0.001% by weight to 3% by weight based on the total weight of the biodegradable polyester resin composition. As the content of the nanocellulose satisfies the above range, the biodegradability and strength can be further enhanced. More specifically, the content of the nanocellulose may be 0.001% by weight to 3% by weight, 0.005% by weight to 3% by weight, 0.005% by weight to 1.8% by weight, 0.01% by weight to 3% by weight, 0.01% by weight to 2% by weight, or 0.01% by weight to 1.8% by weight, based on the total weight of the composition.

For example, the nanocellulose may comprise one or more selected from the group consisting of bacterial cellulose, nanocellulose pretreated with a silane coupling agent, and nanocellulose with adjusted light transmittance.

Specifically, the nanocellulose may comprise one or more selected from the group consisting of (i) bacterial cellulose having a three-dimensional network structure with a diameter of 100 nm or less, (ii) nanocellulose pretreated with a silane coupling agent represented by the following Formula 1, and (iii) nanocellulose having a rate of change in light transmittance of 25% or less according to the following Equation 1.

[Formula 1]

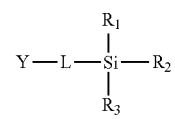

In Formula 1, Y is an organic functional group, L is an alkylene group or an arylene group, $R_1$ is an alkyl group, and $R_2$ and $R_3$ are each independently a hydrolyzable group.

$$\text{Rate of change in light transmittance (\%)} = \frac{|LT1 - LT2|}{LT1} \times 100 \quad \text{[Equation 1]}$$

In Equation 1, LT1 is a first light transmittance (%) of an aqueous dispersion in which the nanocellulose is dispersed in an amount of 0.1% by weight to 5% by weight, when measured under the conditions of a temperature of 30° C. and a wavelength of 850 nm, and LT2 is a second light transmittance (%) measured after 12 hours under the same conditions.

Bacterial Cellulose

According to an embodiment, the biodegradable polyester resin composition comprises bacterial cellulose.

Specifically, since bacterial cellulose has excellent crystallinity and hydrogen bonding capability, it has a low thermal expansion rate, and the strength characteristics such as tensile strength and impact strength, transparency, and biocompatibility can be enhanced. More specifically, bacterial cellulose contains more components of a triclinic unit cell structure whereas cellulose derived from plants contains more components of a monoclinic unit cell structure. Thus, bacterial cellulose has high crystallinity and hydrogen bonding capability as compared with cellulose derived from plants. In addition, cellulose derived from plants is composed of hemicellulose, lignin, and the like, whereas bacterial cellulose is composed of pure cellulose only, so that it has an advantage in that no additional separation and removal operation is required.

As the biodegradable polyester resin composition comprises the bacterial cellulose, it is excellent in biocompatibility. Thus, it can pass the cytotoxicity test, maximization sensitization test, intracutaneous reactivity test (or irritation test), subacute or subchronic systemic toxicity test, and genotoxicity test according to the international standard ISO 10993-1, and it shows no toxicity.

The bacterial cellulose may have a diameter of 100 nm or less. For example, the diameter of the bacterial cellulose may be 90 nm or less, 85 nm or less, 5 nm to 100 nm, 5 nm to 90 nm, 10 nm to 85 nm, 25 nm to 70 nm, or 25 nm to 65 nm. As the diameter of the bacterial cellulose satisfies the above range, the biodegradability, as well as, in particular, biocompatibility can be further enhanced.

FIG. 5 shows a transmission electron microscope (TEM) image of bacterial cellulose. FIG. 6 shows a scanning electron microscopy (SEM) image of bacterial cellulose.

In addition, the bacterial cellulose has a three-dimensional network structure. Specifically, the bacterial cellulose has a large surface area as very thin and long fibers satisfying the above diameter range form a three-dimensional network structure. Thus, the biodegradability and biocompatibility can be further enhanced.

The crystal structure of the bacterial cellulose may have peaks at diffraction angles (2θ) of 14.5±0.2° and 22.7±0.2° in the X-ray diffraction spectrum. FIG. 7 shows an X-ray diffraction spectrum of bacterial cellulose.

In addition, the bacterial cellulose may have a crystallinity of 70% or more according to the following Equation 2. For example, the crystallinity of the bacterial cellulose may be 75% or more, 80% or more, 70% to 98%, 70% to 95%, 70% to 90%, or 75% to 85%.

Crystallinity (%)=[(Ic−Ia)/Ic]×100     [Equation 2]

In Equation 2, the crystallinity is measured by X-ray diffraction analysis, Ic is the diffraction intensity at a diffraction angle 2θ=22.7±0.2°, and Ia is the diffraction intensity at a diffraction angle 2θ=14.5±0.2°.

For example, the crystallinity may be measured using an X-ray diffractometer (high-resolution X-ray diffractometer, Bruker D8 DISCOVER, Bruker, Germany) with Cu K-α radiation (1.540600 Å) at 40 kV and 40 mA.

In addition, the bacterial cellulose may have a crystallinity of 70% or more as measured by differential scanning calorimeter (DSC). For example, the crystallinity of the bacterial cellulose as measured by differential scanning calorimeter may be 75% or more, 80% or more, 70% to 98%, 70% to 95%, 70% to 90%, or 75% to 85%.

In the differential scanning calorimetry method, qualitative information is obtained from the position, shape, and number of peaks by measuring the flow of heat related to thermal transitions of a sample using a differential scanning calorimeter, and quantitative information of the calorific change may be obtained from the area of the peak.

The crystallinity may be calculated by dividing the melting enthalpy ($\Delta H_f$) measured using a differential scanning calorimeter by the melting enthalpy of 100% crystal. For example, the melting enthalpy may be measured while raising the temperature from −20° C. to 220° C. at a temperature elevation rate of 20° C./min in a nitrogen atmosphere using Q20 (manufacturer: TA Instrument).

As the crystallinity and diffraction angle of the bacterial cellulose satisfies the above range, the biodegradability, as well as strength characteristics such as tensile strength and impact strength and biocompatibility can be further enhanced. In particular, since the crystallinity of the bacterial cellulose is superior to that of cellulose derived from plants, which is 40% to 65%, strength characteristics such as tensile strength and impact strength can be maximized.

In addition, the bacterial cellulose may have a bulk density of 1,400 kg/m³ to 1,800 kg/m³. For example, the bulk density of the bacterial cellulose may be 1,450 kg/m³ to 1,800 kg/m³, 1,500 kg/m³ to 1,750 kg/m³, or 1,500 kg/m³ to 1,700 kg/m³.

The biodegradable polyester resin composition may comprise the bacterial cellulose in an amount of 0.01% by weight to 3% by weight based on the total weight of the composition. For example, the content of the bacterial cellulose may be 0.01% by weight to 2.5% by weight, 0.05% by weight to 2% by weight, 0.07% by weight to 1.8% by weight, or 0.07% by weight to 1.2% by weight, based on the total weight of the composition. As the content of the bacterial cellulose satisfies the above range, the biodegradability and strength characteristics can be further enhanced.

In addition, the biodegradable polyester resin composition according to the embodiment may comprise second cellulose different from the first cellulose, which is a bacterial cellulose having a three-dimensional network structure with a diameter of 100 nm or less. Specifically, the bacterial cellulose having a three-dimensional network structure with a diameter of 100 nm or less may be first cellulose, and the biodegradable polyester resin composition may further comprise second cellulose different from the first cellulose.

The diameter of the second cellulose may be smaller than the diameter of the first cellulose. Specifically, the second cellulose may be bacterial cellulose having a diameter of 90 nm or less, 80 nm or less, 1 nm to 90 nm, 3 nm to 80 nm, 5 nm to 70 nm, or 5 nm to 50 nm. As it further comprises the second cellulose having a diameter of the above range, the biodegradability and strength characteristics can be further enhanced.

As the biodegradable polyester resin composition according to the embodiment comprises bacterial cellulose, all of biodegradability, strength, transparency, and processability can be enhanced. In particular, it has excellent biocompatibility.

Nanocellulose Pretreated with a Silane Coupling Agent

According to another embodiment, the biodegradable polyester resin composition comprises nanocellulose pretreated with a silane coupling agent represented by the following Formula 1.

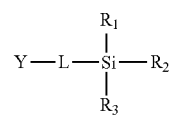

[Formula 1]

In Formula 1, Y is an organic functional group, L is an alkylene group or an arylene group, $R_1$ is an alkyl group, and $R_2$ and $R_3$ are each independently a hydrolyzable group.

Specifically, Y is an organic functional group and may be an alkenyl group, an epoxy group, a methacryl group, a $C_{1-10}$ alkoxy group, a $C_{1-10}$ amine group, a $C_{1-10}$ alkylamine group, a $C_{6-15}$ arylamine group, a $C_{3-15}$ heteroarylamine group, a $C_{6-15}$ arylalkyl group, or a $C_{3-15}$ heteroaryl group, wherein the heteroarylamine group and the heteroaryl group may contain one or more elements selected from the group consisting of N, O, and S. In addition, the alkenyl group may be, for example, a vinyl group.

L is an alkylene group or an arylene group. Specifically, it may be a $C_{1-10}$ alkylene group or a $C_{6-15}$ arylene group.

$R_1$ is an alkyl group. Specifically, it may be a $C_{1-10}$ alkyl group.

In addition, $R_2$ and $R_3$ are each independently a hydrolyzable group. Specifically, they may each independently be a halogen group, a $C_{1-10}$ alkoxy group, a $C_{6-15}$ aryloxy group, a $C_{6-15}$ alkylaryloxy group, a $C_{1-10}$ acyloxy group, a $C_{1-10}$ alkylthiol group, a $C_{1-10}$ amine group, a methacryloxy group, or an oxime group. Preferably, $R_2$ and $R_3$ may each independently be a $C_{1-10}$ alkoxy group, more preferably a methoxy group or an ethoxy group, but they are not limited thereto. In addition, $R_2$ and $R_3$ may each independently be a $C_{1-10}$ alkoxy group substituted with a $C_{1-10}$ alkoxy group.

The pretreatment method may be a dry method or a wet method, but it is not limited thereto.

Specifically, the pretreatment method may be a dry method in which nanocellulose and a silane coupling agent are charged to a uniform mixing device such as a super mixer, stirred at high speeds, and then dried at 100° C. to 120° C. for 1 hour or longer, or a wet method in which a silane coupling agent is added to a nanocellulose dispersed in water and then stirred for 1 hour or longer with a stirrer. The surface of the nanocellulose can be hydrophobically treated through such a dry method and a wet method.

The nanocellulose may be pretreated, that is, hydrophobically treated with a silane coupling agent represented by Formula 1 to enhance the interfacial adhesion, dispersibility, and compatibility. Thus, the biodegradable polyester resin composition comprising the same has excellent mechanical properties and durability, in particular, hydrolysis resistance.

In addition, the nanocellulose may be pretreated with a silane coupling agent in an amount of 0.01% by weight to 10% by weight based on the total weight of the nanocellulose. For example, the nanocellulose may be pretreated with a silane coupling agent in an amount of 0.05% by weight to 8% by weight, 0.1% by weight to 8% by weight, 0.5% by weight to 6% by weight, or 0.7% by weight to 6% by weight, based on the total weight of the nanocellulose.

As the content of a silane coupling agent satisfies the above range, it is possible to maximize the interfacial adhesion, dispersibility, and compatibility. Thus, the biodegradable polyester resin composition comprising the same can be further enhanced in mechanical properties and durability, in particular, hydrolysis resistance.

The nanocellulose may be one or more selected from the group consisting of cellulose nanocrystals, cellulose nanofibers, and microfibrillated cellulose. Cellulose nanocrystals or cellulose nanofibers are preferred from the viewpoint of strength and thermal characteristics. As the biodegradable polyester resin composition further comprises the nanocellulose, the biodegradability, strength, and thermal characteristics can be further enhanced.

More specifically, the nanocellulose may be one or more selected from the group consisting of hydroxymethyl cellulose, hydroxyethyl cellulose, hydroxypropyl cellulose, hydroxypropylmethyl cellulose, cellulose acetate, methyl cellulose, ethyl cellulose, propyl cellulose, butyl cellulose, pentyl cellulose, hexyl cellulose, and cyclohexyl cellulose.

The nanocellulose may have a diameter of 1 nm to 100 nm. For example, the diameter of the nanocellulose may be 1 nm to 95 nm, 5 nm to 90 nm, 10 nm to 80 nm, 5 nm to 60 nm, or 15 nm to 60 nm.

In addition, the nanocellulose may have a length of 5 nm to 10 μm. For example, the length of the nanocellulose may be 5 nm to 5 μm, 5 nm to 1 μm, 10 nm to 700 nm, 20 nm to 500 nm, 60 nm to 300 nm, 80 nm to 200 nm, 100 nm to 250 nm.

As the diameter and length of the nanocellulose satisfy the above ranges, the strength, in particular, tear strength can be further enhanced.

In addition, the content of the nanocellulose may be 0.01% by weight to 3% by weight based on the total weight of the composition. For example, the content of the nanocellulose may be 0.01% by weight to 2.5% by weight, 0.05% by weight to 2% by weight, 0.07% by weight to 1.8% by weight, 0.1% by weight to 1.2% by weight, 0.1% by weight to 1% by weight, or 0.15% by weight to 0.7% by weight, based on the total weight of the composition. As the content of the nanocellulose satisfies the above range, the biodegradability and strength can be further enhanced.

In addition, the nanocellulose may have a crystallinity of 70% or more as measured by differential scanning calorimeter (DSC). For example, the crystallinity of the nanocellulose as measured by differential scanning calorimeter may be 75% or more, 80% or more, 70% to 98%, 70% to 95%, 75% to 90%, or 80% to 90%.

In the differential scanning calorimetry method, qualitative information is obtained from the position, shape, and number of peaks by measuring the flow of heat related to thermal transitions of a sample using a differential scanning calorimeter, and quantitative information of the calorific change may be obtained from the area of the peak.

The crystallinity may be calculated by dividing the melting enthalpy ($\Delta H_f$) measured using a differential scanning calorimeter by the melting enthalpy of 100% crystal. For example, the melting enthalpy may be measured while raising the temperature from −20° C. to 220° C. at a temperature elevation rate of 20° C./min in a nitrogen atmosphere using Q20 (manufacturer: TA Instrument).

As the biodegradable polyester resin composition according to the embodiment comprises nanocellulose pretreated with a silane coupling agent represented by Formula 1, it is possible to enhance the dispersibility, strength, and processability, as well as durability, in particular, such as hydrolysis resistance without impairing the biodegradability, Thus, it can be applied to various fields and exhibit excellent characteristics.

Nanocellulose with an Adjusted Rate of Change in Light Transmittance

According to still another embodiment, the biodegradable polyester resin composition comprises nanocellulose having a rate of change in light transmittance of 25% or less.

The nanocellulose according to the embodiment has a rate of change in light transmittance of 25% or less according to Equation 1.

$$\text{Rate of change in light transmittance (\%)} = \frac{|LT1 - LT2|}{LT1} \times 100 \qquad [\text{Equation 1}]$$

In Equation 1, LT1 is a first light transmittance (%) of an aqueous dispersion in which the nanocellulose is dispersed in an amount of 0.1% by weight to 5% by weight, when measured under the conditions of a temperature of 30° C. and a wavelength of 850 nm, and LT2 is a second light transmittance (%) measured after 12 hours under the same conditions.

In general, nanocellulose as a natural material is prepared in the form of a gel or in the form of a dry powder through lyophilization to reduce its volume for convenient storage and transportation. Since aggregation takes place during the preparation process, however, secondary particles as agglomerated rather than single particles may be present. Thus, if nanocellulose in the form of a gel or a dry powder is used for preparing a biodegradable polyester resin composition, there is a problem in that the dispersibility is not good, resulting in poor biodegradability, as well as poor durability, in particular, such as tear strength and sealing strength.

However, while the nanocellulose according to the embodiment is nanocellulose as a natural material in the form of a gel or a dry powder, an aqueous dispersion in which it is dispersed in water in an amount of 0.1% by weight to 5% by weight has a rate of change in light transmittance of 25% or less under specific conditions of temperature, time, and wavelength, so that it is excellent in both dispersibility and light transmittance. Thus, it is possible to enhance all of the dispersion stability, strength, and processability of the biodegradable polyester resin composition comprising the nanocellulose.

First, the nanocellulose may be in the form of a dry powder or gel having secondary particles aggregated to a particle size of 1 μm to 50 μm. For example, the nanocellulose may be in the form of a dry powder or gel having agglomerated secondary particles rather than single particles, wherein the size of the secondary particles may be 2 μm to 45 μm or 5 μm to 50 μm. In addition, as described above, the nanocellulose may be in the form of lyophilized powder to reduce its volume for convenient storage and transportation.

The nanocellulose may be one or more selected from the group consisting of cellulose nanocrystals, cellulose nanofibers, and microfibrillated cellulose. Cellulose nanocrystals or cellulose nanofibers are preferred from the viewpoint of strength and thermal characteristics. If the nanocellulose is employed in the biodegradable polyester resin composition, it is possible to further enhance the biodegradability, strength, and thermal characteristics.

More specifically, the nanocellulose may be one or more selected from the group consisting of hydroxymethyl cellulose, hydroxyethyl cellulose, hydroxypropyl cellulose, hydroxypropylmethyl cellulose, cellulose acetate, methyl cellulose, ethyl cellulose, propyl cellulose, butyl cellulose, pentyl cellulose, hexyl cellulose, and cyclohexyl cellulose.

The nanocellulose according to the embodiment has a rate of change in light transmittance of 25% or less according to the above Equation 1.

Specifically, the rate of change in light transmittance is one measured for an aqueous dispersion in which the nanocellulose in the form of a dry powder or gel is dispersed in an amount of 0.1% by weight to 5% by weight for 12 hours under the conditions of a temperature of 30° C. and a wavelength of 850 nm.

For example, the content of the nanocellulose employed in the aqueous dispersion may be 0.3% by weight to 5% by weight, 0.5% by weight to 4% by weight, 0.5% by weight to 3.5% by weight, 0.8% by weight to 3% by weight, 0.9% by weight to 3% by weight %, 0.9% by weight to 2.5% by weight, or 1% by weight to 2% by weight. Here, the content of the nanocellulose may be based on the total weight of water in which the nanocellulose is dispersed.

For example, the rate of change in light transmittance may be measured using Turbiscan (manufacturer: Formulaction). Specifically, Turbiscan is a device that measures the change in dispersion stability over time under a constant temperature condition for the total height of a sample, which can provide a result of quantitative analysis for dispersion stability. More specifically, a light source of a specific wavelength is irradiated for the height of the entire sample using Turbiscan to measure the amount that collides with the sample particles and is scatted and the amount that passes through the sample particles.

The rate of change in light transmittance according to the embodiment can be obtained by putting the aqueous dispersion in a container and measuring the light transmittance for the entire height thereof. Specifically, the light transmittance may be one measured in the upper layer for the entire height of the sample. The lower the dispersion stability of the sample, the more the heavy particles sink; thus, the light transmittance of the upper layer increases. Accordingly, the greater the rate of change in light transmittance, the lower the dispersion stability. Here, the upper layer refers to a portion from the top to a position that is ⅓ of the total height of the sample.

Specifically, the aqueous dispersion is measured at a temperature of 30° C. and a wavelength of 850 nm for a first light transmittance (LT1) and for a second light transmittance (LT2) after 12 hours under the same conditions. Then, the rate of change in light transmittance can be calculated as a ratio of the absolute value of the difference between LT1 and LT2 to LT1 as shown in Equation 1. More specifically, the rate of change in light transmittance can be calculated according to Equation 1. It is a ratio of the absolute value of the difference between the initial light transmittance (LT1) measured at a temperature of 30° C. and a wavelength of 850 nm and the light transmittance (LT2) measured after 12 hours under the same conditions to LT1.

The light transmittance of the aqueous dispersion in which the nanocellulose is dispersed in an amount of 1% by weight or 2% by weight as measured at a temperature of 30° C. and a wavelength of 850 nm may be 3% to 35%. For example, the light transmittance (LT1) of the aqueous dispersion in which the nanocellulose is dispersed in an amount of 1% by weight or 2% by weight as measured at a temperature of 30° C. and a wavelength of 850 nm may be 7% to 35%, 9% to 33%, 10% to 33%, or 10% to 28%.

In addition, the light transmittance of the aqueous dispersion in which the nanocellulose is dispersed in an amount of 1% by weight or 2% by weight as measured at a wavelength of 850 nm after 12 hours at a temperature of 30° C. may be 5% to 40%. For example, the light transmittance of the aqueous dispersion in which the nanocellulose is dispersed in an amount of 1% by weight or 2% by weight as measured at a wavelength of 850 nm after 12 hours at a temperature of 30° C. may be 7% to 40%, 9% to 38%, 10% to 35%, or 11% to 31%.

The nanocellulose according to the embodiment may have an average particle size of 200 nm or less and a particle size deviation of 20% or less. Specifically, the average particle size of the nanocellulose dispersed in water may be 190 nm or less or 185 nm or less, and the particle size deviation may be 18% or less or 16% or less. As the average particle size and particle size deviation of the nanocellulose satisfy the above ranges, both the dispersibility and durability of the nanocellulose are excellent.

The nanocellulose according to the embodiment may be pretreated with a bead mill or pretreated with ultrasonic waves. Specifically, the nanocellulose may be obtained by pretreating nanocellulose dispersed in water with a bead mill or ultrasonic waves.

For example, the nanocellulose may be prepared by dispersing cellulose nanocrystals in the form of a dry powder or gel with a particle size of 1 μm to 50 μm in water and then pretreating them with a bead mill or ultrasonic waves.

First, the bead mill pretreatment may be carried out by a vertical mill or a horizontal mill as a wet milling apparatus. The horizontal mill is preferable in that the amount of beads that can be charged inside the chamber is greater, the machine's uneven wear is smaller, the wear of beads is smaller, and the maintenance and repair are convenient, but it is not limited thereto.

The bead mill pretreatment may be carried out using one or more beads selected from the group consisting of zirconium, zircon, zirconia, quartz, and aluminum oxide.

Specifically, the bead mill pretreatment may be carried out using beads having a diameter of 0.3 mm to 1 mm. For example, the diameter of beads may be 0.3 mm to 0.9 mm, 0.4 mm to 0.8 mm, 0.45 mm to 0.7 mm, or 0.45 mm to 0.6 mm. As the diameter of beads satisfies the above range, it is possible to further enhance the dispersibility of the nanocellulose. If the diameter of beads exceeds the above range, the particle size and particle size deviation of the nanocellulose may increase, which may reduce the dispersibility, whereby the light transmittance may be uneven, resulting in a deterioration in the quality.

In addition, it is preferable from the viewpoint of transfer of sufficient energy that the bead mill pretreatment is carried out with beads having a specific gravity greater than that of the nanocellulose. For example, the beads may be one or more selected from the group consisting of zirconium, zircon, zirconia, quartz, and aluminum oxide, which have a specific gravity greater than the nanocellulose dispersed in water. Zirconium beads having a specific gravity greater than that of the nanocellulose dispersed in water by 4 times or more are preferred, but they are not limited thereto.

The bead mill pretreatment may be carried out by filling beads in 80% or more of the chamber. In addition, the bead mill pretreatment may be carried out at a linear speed of 20 m/sec or less. Specifically, the bead mill pretreatment may be carried out at a bead filling rate of 80% or more in the chamber and a linear speed of 20 msec or less. For example, the bead mill pretreatment may be carried out at a bead filling rate of 80% or more or 83% or more in the chamber and a linear speed of 18 msec or less or 16 msec or less. As the filling rate and the linear speed satisfy the above ranges, the effect of the bead mill pretreatment, that is, the enhancement in dispersibility can be maximized.

In addition, the ultrasonic pretreatment is a method of physically crushing or pulverizing nanoparticles with waves generated by emitting ultrasonic waves of 20 kHz into a solution.

The ultrasonic pretreatment may be carried out for less than 30 minutes with an energy dose of 30,000 J or less. For example, the ultrasonic pretreatment may be carried out for 25 minutes or less, 20 minutes or less, or 18 minutes or less with an energy dose of 25,000 J or less or 22,000 J or less. As the energy dose and the operation time satisfy the above ranges, the effect of the pretreatment with ultrasonic waves, that is, the enhancement in dispersibility can be maximized. If the energy dose exceeds the above range, the nanoparticles may be re-agglomerated, thereby deteriorating the dispersibility.

The nanocellulose according to the embodiment may be pretreated with a bead mill or pretreated with ultrasonic waves. Alternatively, the nanocellulose according to the embodiment may be pretreated with both a bead mill and ultrasonic waves. In such event, it is preferable that ultrasonic pretreatment is carried out after the bead mill pretreatment to prevent re-agglomeration, thereby enhancing the dispersibility.

If the nanocellulose, specifically, the nanocellulose dispersed in water is pretreated with a bead mill or pretreated with ultrasonic waves, the dispersibility can be maximized, whereby the number of nanocellulose particles can be increased. Specifically, the number of nanocellulose particles dispersed in water and further pretreated with a bead mill or ultrasonic waves may be greater than that of nanocellulose particles dispersed in water without pretreatment with a bead mill or ultrasonic waves in the same content when they have similar rates of change in light transmittance. Thus, if the nanocellulose is further pretreated with a bead mill or ultrasonic waves, the dispersion stability may be further enhanced.

Accordingly, a biodegradable polyester film formed from a biodegradable polyester resin composition comprising the nanocellulose has excellent quality applicable to packaging materials for products stored and transported at low temperatures, automotive interior materials that require durability, garbage bags, mulching films, and disposable products.

The content of the nanocellulose may be 0.01% by weight to 3% by weight based on the total weight of the composition. For example, the content of the nanocellulose may be 0.01% by weight to 2.5% by weight, 0.02% by weight to 2% by weight, 0.02% by weight to 1.5% by weight, 0.04% by weight to 1.2% by weight, 0.05% by weight to 1% by weight, 0.05% by weight to 0.8% by weight, or 0.05% by weight to 0.7% by weight, based on the total weight of the composition. As the content of the nanocellulose satisfies the above range, the biodegradability, dispersibility, and strength can be further enhanced.

Catalyst and Additive

The biodegradable polyester resin composition may comprise a titanium-based catalyst, a germanium-based catalyst, an antimony-based catalyst, or the like. Specifically, the biodegradable polyester resin composition may comprise one or more catalysts selected from the group consisting of titanium isopropoxide, tetrapropyl titanate, tetrabutyl titanate, tetraisopropyl titanate, germanium oxide, germanium methoxide, germanium ethoxide, tetramethyl germanium, tetraethyl germanium, germanium sulfide, antimony trioxide, antimony acetate, antimony triethylene glycol, dibutyltin oxide, calcium acetate, and magnesium acetate.

In addition, the content of the catalyst may be 50 ppm to 1,000 ppm or 100 ppm to 1,000 ppm based on the total weight of the composition. For example, the biodegradable polyester resin composition may comprise the catalyst in an amount of 55 ppm to 900 ppm, 70 ppm to 850 ppm, 100 ppm to 800 ppm, 100 ppm to 700 ppm, 150 ppm to 700 ppm, 200 ppm to 500 ppm, 130 ppm to 500 ppm, 130 ppm to 450 ppm, 130 ppm to 300 ppm, or 250 ppm to 450 ppm, based on the total weight of the composition. As the content of the catalyst satisfies the above range, the processability can be enhanced without discoloration such as yellowing.

In addition, the biodegradable polyester resin composition may further comprise one or more selected from the group consisting of an additive such as silica, potassium, and magnesium, a stabilizer such as trimethyl phosphate, triphenyl phosphate, trimethyl phosphine, phosphoric acid, and phosphorous acid, and a color correcting agent such as cobalt acetate.

Biodegradable Nonwoven Fabric

In addition, there is provided a biodegradable polyester nonwoven fabric, which comprises the biodegradable polyester resin composition according to the embodiment. That is, the biodegradable polyester nonwoven fabric is formed from the biodegradable polyester resin composition according to the embodiment.

The biodegradable nonwoven fabric according to an embodiment comprises a nonwoven fabric layer formed from a biodegradable polyester resin composition, wherein the biodegradable polyester resin composition comprises a diol component comprising 1,4-butanediol or a derivative thereof and a dicarboxylic acid component, the dicarboxylic acid component comprises a first dicarboxylic acid and a second dicarboxylic acid different from the first dicarboxylic acid, the first dicarboxylic acid comprises at least one selected from the group consisting of terephthalic acid, dimethyl terephthalic acid, and derivatives thereof, and the second dicarboxylic acid comprises at least one selected from the group consisting of adipic acid, succinic acid, and derivatives thereof.

In particular, as the biodegradable nonwoven fabric according to an embodiment comprises a nonwoven fabric layer formed from the biodegradable polyester resin composition, it has good texture or wearing comfort and is excellent in quality since it has almost no defects such as fisheyes. Thus, the biodegradable nonwoven fabric can be readily applied to various products such as packaging materials, masks, and dishcloths. In particular, when applied to a mask, it is very excellent in wearing comfort.

The biodegradable nonwoven fabric may comprise an antimicrobial coating layer positioned on at least one side of the nonwoven fabric layer.

FIG. 1 shows a mask (1) prepared using the biodegradable nonwoven fabric according to an embodiment. FIGS. 2 and 3 each show a cross-sectional view of the mask of FIG. 1 according to an embodiment taken along X-X'.

Specifically, FIG. 2 illustrates a biodegradable nonwoven fabric (2) having an antimicrobial coating layer (200) formed on one side of a nonwoven fabric layer (100). FIG. 3 illustrates a biodegradable nonwoven fabric (2) having an antimicrobial coating layer (200) formed on both sides of a nonwoven fabric layer (100). More specifically, FIG. 2 shows a cross-sectional view of the mask (1) having an antimicrobial coating layer (200) formed on the inner side or the outer side. FIG. 3 shows a cross-sectional view of the mask (1) having an antimicrobial coating layer (200) formed on the inner side and the outer side.

As the biodegradable nonwoven fabric comprises a nonwoven fabric layer and an antimicrobial coating layer positioned on one or both sides of the nonwoven fabric layer as described above, the antimicrobial characteristics can be further enhanced. The use of the biodegradable nonwoven fabric is not limited to masks. For example, when the biodegradable nonwoven fabric is used as a packaging material for food or medicine, it is possible to effectively prevent the deterioration of the food or the growth of microorganisms in the medical products.

The antimicrobial coating layer may comprise silver nanoparticles in an amount of 0.5% by weight to 10% by weight based on the total weight of the antimicrobial coating layer. For example, the content of silver nanoparticles may be 0.5% by weight to 8% by weight, 0.5% by weight to 3% by weight, 0.7% by weight to 2.5% by weight, or 0.8% by weight to 1.5% by weight, based on the total weight of the antimicrobial coating layer. As the content of silver nanoparticles satisfies the above range, the antimicrobial characteristics can be further enhanced. In particular, when the biodegradable nonwoven fabric comprising the antimicrobial coating layer is used as a packaging material for food, it is possible to more effectively prevent the deterioration of the food.

The nonwoven fabric layer may have a thickness of 0.1 mm to 10 mm. For example, the thickness of the nonwoven fabric layer may be 0.1 mm to 5.0 mm, 0.1 mm to 3.0 mm, 0.1 mm to 0.5 mm, 0.5 mm to 3.0 mm, 0.5 mm to 1.0 mm, or 1.0 mm to 2.0 mm.

In addition, the antimicrobial coating layer may have a thickness of 10 nm to 1 μm. For example, the thickness of the antimicrobial coating layer may be 10 nm to 700 nm, 20 nm to 500 nm, 20 nm to 100 nm, 50 nm to 500 nm, or 90 nm to 500 nm.

The biodegradable nonwoven fabric may have a thickness of 0.1 mm to 10 mm. For example, the thickness of the biodegradable nonwoven fabric may be 0.1 mm to 5.0 mm, 0.1 mm to 3.0 mm, 0.1 mm to 0.5 mm, 0.5 mm to 3.0 mm, 0.5 mm to 1.0 mm, or 1.0 mm to 2.0 mm.

The nonwoven fabric layer may have an average pore size of 200 μm or less. For example, the average pore size of the nonwoven fabric layer may be 180 μm or less, 160 μm or less, 10 μm to 200 μm, 50 μm to 200 μm, 100 μm to 180 μm, or 130 μm to 160 μm.

As the average pore size of the nonwoven fabric layer satisfies the above range, the air permeability and flexibility can be further enhanced.

The nonwoven fabric layer may have a tensile strength of 25 MPa or more. For example, the tensile strength of the nonwoven fabric layer may be 30 MPa or more, 33 MPa or more, 35 MPa or more, 30 MPa to 60 MPa, 33 MPa to 55 MPa, or 33 MPa to 53 MPa.

The nonwoven fabric layer may have a tear strength of 300 N/cm or more. For example, the tear strength of the nonwoven fabric layer may be 350 N/cm or more, 450 N/cm or more, 500 N/cm or more, 550 N/cm or more, 400 N/cm to 1,500 N/cm, 450 N/cm to 1,300 N/cm, 500 N/cm to 1,200 N/cm, or 550 N/cm to 1,100 N/cm.

In addition, the nonwoven fabric layer may have an elongation of 400% or more. For example, the elongation of the nonwoven fabric layer may be 450% or more, 500% or more, 550% or more, 400% to 900%, 450% to 800%, or 550% to 750%.

As the tensile strength, tear strength, and elongation of the nonwoven fabric layer satisfy the above ranges, it is readily applicable to products in various fields, as well as the lifespan can be enhanced.

The nonwoven fabric layer may have an initial elastic modulus of 200 kgf/mm$^2$ or less. For example, the initial elastic modulus of the nonwoven fabric layer may be 180 kgf/mm$^2$ or less, 160 kgf/mm$^2$ or less, 60 kgf/mm$^2$ to 200 kgf/mm$^2$, 80 kgf/mm$^2$ to 180 kgf/mm$^2$, or 85 kgf/mm$^2$ to 160 kgf/mm$^2$. As the initial elastic modulus of the nonwoven fabric layer satisfies the above range, the flexibility can be further enhanced. Thus, the wearing comfort is particularly excellent when applied to products that come into contact with the skin for a long period of time such as masks.

Biodegradable Polyester Film

In addition, there is provided a biodegradable polyester film, which comprises the biodegradable polyester resin composition according to the embodiment. That is, the biodegradable polyester film is formed from the biodegradable polyester resin composition according to the embodiment.

That is, there is provided a biodegradable polyester film formed from a biodegradable polyester resin composition, wherein the biodegradable polyester resin composition comprises a diol component comprising 1,4-butanediol or a derivative thereof; a dicarboxylic acid component comprising a first dicarboxylic acid and a second dicarboxylic acid different from the first dicarboxylic acid; and nanocellulose, the first dicarboxylic acid comprises one or more selected from the group consisting of terephthalic acid, dimethyl terephthalic acid, and derivatives thereof, the second dicarboxylic acid comprises one or more selected from the group consisting of adipic acid, succinic acid, and derivatives thereof, and the nanocellulose is bacterial cellulose having a three-dimensional network structure with a diameter of 100 nm or less, nanocellulose pretreated with a silane coupling agent represented by the following Formula 1, or nanocellulose having a rate of change in light transmittance of 25% or less according to the following Equation 1:

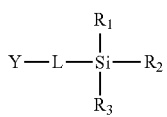

[Formula 1]

In Formula 1, Y is an organic functional group, L is an alkylene group or an arylene group, $R_1$ is an alkyl group, and $R_2$ and $R_3$ are each independently a hydrolyzable group.

$$\text{Rate of change in light transmittance (\%)} = \frac{|LT1 - LT2|}{LT1} \times 100 \quad \text{[Equation 1]}$$

In Equation 1, LT1 is a first light transmittance (%) of an aqueous dispersion in which the nanocellulose is dispersed in an amount of 0.1% by weight to 5% by weight, when measured under the conditions of a temperature of 30° C. and a wavelength of 850 nm, and LT2 is a second light transmittance (%) measured after 12 hours under the same conditions.

The biodegradable polyester film according to an embodiment is a biodegradable polyester film formed from a biodegradable polyester resin composition, wherein the biodegradable polyester resin composition comprises a diol component comprising 1,4-butanediol or a derivative thereof; a dicarboxylic acid component comprising a first dicarboxylic acid and a second dicarboxylic acid different from the first dicarboxylic acid; and bacterial cellulose in a three-dimensional network structure with a diameter of 100 nm or less, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof. As the biodegradable polyester film according to an embodiment is formed from the biodegradable polyester resin composition, it has excellent quality, particularly when applied to medical devices or packaging materials.

The biodegradable polyester film according to another embodiment is a biodegradable polyester film formed from a biodegradable polyester resin composition, wherein the biodegradable polyester resin composition comprises a diol component comprising 1,4-butanediol or a derivative thereof; a dicarboxylic acid component comprising a first dicarboxylic acid and a second dicarboxylic acid different from the first dicarboxylic acid; and nanocellulose pretreated with a silane coupling agent represented by the above Formula 1, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof. As the biodegradable polyester film is formed from the biodegradable polyester resin composition, it has excellent quality applicable to packaging materials for products stored and transported at low temperatures, automotive interior materials that require durability, and garbage bags.

The biodegradable polyester film according to still another embodiment comprises nanocellulose having a rate of change in light transmittance of 25% or less according to the above Equation 1. Specifically, the biodegradable polyester film according to the embodiment is a biodegradable polyester film formed from a biodegradable polyester resin composition, wherein the biodegradable polyester resin composition comprises a diol component comprising 1,4-butanediol or a derivative thereof; a dicarboxylic acid component comprising one or more selected from the group consisting of terephthalic acid, dimethyl terephthalic acid, adipic acid, succinic acid, and derivatives thereof; and nanocellulose having a rate of change in light transmittance of 25% or less according to the above Equation 1. More specifically, the biodegradable polyester film according to the embodiment is a biodegradable polyester film formed from a biodegradable polyester resin composition, wherein the biodegradable polyester resin composition comprises a diol component comprising 1,4-butanediol or a derivative thereof; a dicarboxylic acid component comprising a first dicarboxylic acid and a second dicarboxylic acid different from the first dicarboxylic acid; and nanocellulose having a rate of change in light transmittance of 25% or less according to the above Equation 1, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof. The biodegradable polyester film formed from the biodegradable polyester resin composition comprising the nanocellulose has excellent quality applicable to packaging materials for products stored and transported at low temperatures, automotive interior materials that require durability, garbage bags, mulching films, and disposable products.

Details on the diol component, the dicarboxylic acid component, and the nanocellulose are as described above.

The biodegradable polyester film may have a thickness of 5 μm to 200 μm. For example, the thickness of the biodegradable polyester film may be 5 μm to 180 μm, 5 μm to 160 μm, 10 μm to 150 μm, 15 μm to 130 μm, 20 μm to 100 μm, 15 μm to 100 μm, 25 μm to 80 μm, or 25 μm to 60 μm.

The biodegradable polyester film may have a tensile strength of 25 MPa or more. For example, the tensile strength of the biodegradable polyester film may be 30 MPa or more, 35 MPa or more, 40 MPa or more, 45 MPa or more, 48 MPa or more, 35 MPa to 70 MPa, 40 MPa to 70 MPa, 40 MPa to 65 MPa, 45 MPa to 65 MPa, 45 MPa to 63 MPa, 48 MPa to 60 MPa, or 48 MPa to 55 MPa.

The biodegradable polyester film may have a deviation in tensile strength of 7% or less. For example, the deviation in tensile strength of the biodegradable polyester film may be 6.5% or less or 6.3% or less.

In addition, the biodegradable polyester film may have a rate of change in tensile strength of 30% or less for 6 months under the conditions of a temperature of 25° C. and a humidity of 50% RH. For example, the rate of change in tensile strength of the biodegradable polyester film may be 28% or less or 26% or less for 6 months under the conditions of a temperature of 25° C. and a humidity of 50% RH. As the rate of change in tensile strength satisfies the above range, the durability can be further enhanced.

The tear strength of the biodegradable polyester film may be 300 N/cm or more, 400 N/cm or more, or 500 N/cm or more, and 1,800 N/cm or less, 1,500 N/cm or less, or 1,300 N/cm or less, specifically, 500 N/cm to 1,800 N/cm, 700 N/cm to 1,800 N/cm, 700 N/cm to 1,500 N/cm, or 500 N/cm to 1,300 N/cm.

The elongation of the biodegradable polyester film may be 400% or more, 500% or more, or 600% or more, and 1,500% or less, 1,300% or less, or 1,200% or less, specifically, 400% to 1,500%, 400% to 1,300%, 400% to 1,200%, 500% to 1,500%, 500% to 1,400%, or 500% to 1,200%.

In addition, the biodegradable polyester film may have a sealing strength of 800 gf or more. For example, the sealing strength of the biodegradable polyester film may be 830 gf or more, 850 gf or more, or 880 gf or more.

The biodegradable polyester film may have a unit impact absorption energy of 0.85 kgf-cm/μm or more. For example, the unit impact absorption energy of the biodegradable polyester film may be 0.9 kgf-cm/μm or more or 0.95 kgf-cm/μm or more.

In addition, the biodegradable polyester film may have a deviation in crystallinity of 2% or less as measured at a diffraction angle 2θ of 10° to 80° with an X-ray diffraction analyzer. For example, the deviation in crystallinity of the biodegradable polyester film may be 1.9% or less, 1.8% or less, or 1.7% or less, as measured at a diffraction angle 2θ of 10° to 80° with an X-ray diffraction analyzer.

Process for Preparing a Biodegradable Nonwoven Fabric

The process for preparing a biodegradable nonwoven fabric according to an embodiment comprises subjecting a composition comprising a diol component comprising 1,4-butanediol or a derivative thereof and a dicarboxylic acid component to an esterification reaction to prepare a prepolymer; subjecting the prepolymer to a polycondensation reaction to prepare a polymer; preparing pellets from the polymer; and spinning the pellets to prepare a nonwoven fabric layer, wherein the dicarboxylic acid component comprises a first dicarboxylic acid and a second dicarboxylic acid different from the first dicarboxylic acid, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof. The nonwoven fabric layer prepared according to the embodiment has a tensile strength of 25 MPa or more and an elongation of 400% or more.

FIG. 4 shows a process for preparing a biodegradable nonwoven fabric according to the embodiment.

Hereinafter, referring to FIG. 4, the process for preparing a biodegradable nonwoven fabric according to the embodiment (S100) will be described.

(a) Preparation of a Prepolymer

First, a composition comprising a diol component comprising 1,4-butanediol or a derivative thereof and a dicarboxylic acid component is subjected to an esterification reaction to prepare a prepolymer (S110).

Details on the diol component and the dicarboxylic acid component are as described above.

Step S110 may comprise adding a titanium-based catalyst or a germanium-based catalyst to the composition (S111). Specifically, a titanium-based catalyst or a germanium-based catalyst may be added to the composition before the esterification reaction. Details on the titanium-based catalyst or the germanium-based catalyst are as described above.

In addition, step S110 may comprise adding nanocellulose to the composition (S112). Specifically, nanocellulose may be added to the composition before the esterification reaction. Details on the nanocellulose are as described above. According to an embodiment, the process for preparing a biodegradable nonwoven fabric comprises preparing a composition comprising a diol component comprising 1,4-butanediol or a derivative thereof, a dicarboxylic acid component, and nanocellulose in an amount of 3% by weight or less based on the total weight of the composition; and subjecting the composition to an esterification reaction to prepare a prepolymer.

Here, the nanocellulose added in step S112 may be nanocellulose dispersed in the diol component. For example, the diol component may be 1,4-butanediol, and the nanocellulose added in step S112 may be nanocellulose dispersed in 1,4-butanediol.

Alternatively, the nanocellulose added in step S112 may be nanocellulose dispersed in water and then redispersed in the diol component. Specifically, the nanocellulose may be nanocellulose subjected to dispersion twice as it is dispersed in water and then redispersed in the diol component.

As nanocellulose is dispersed in the same diol component as the diol component employed in the composition, which is then added to the composition as described above, the dispersibility can be enhanced, thereby maximizing the strength, particularly, tear strength.

In addition, one or more selected from the group consisting of an additive such as silica, potassium, and magnesium and a stabilizer such as trimethyl phosphate, triphenyl phosphate, trimethyl phosphine, phosphoric acid, and phosphorous acid may be further added to the composition in step S110 before the esterification reaction.

The esterification reaction may be carried out at 250° C. or lower for 0.5 hour to 5 hours. Specifically, the esterification reaction may be carried out at atmospheric pressure at 240° C. or lower, 235° C. or lower, 180° C. to 250° C., 185° C. to 240° C., or 200° C. to 240° C., until water and methanol as by-products theoretically reach 90%. For example, the esterification reaction may be carried out for 0.5 hour to 4.5 hours, 0.5 hour to 3.5 hours, or 1 hour to 3 hours, but it is not limited thereto.

The prepolymer may have a number average molecular weight of 500 to 10,000. For example, the number average molecular weight of the prepolymer may be 500 to 8,500, 500 to 7,000, 1,000 to 6,000, or 2,500 to 5,500. Alternatively, the prepolymer may have a number average molecular weight of 1,500 to 10,000. For example, the number average molecular weight of the prepolymer may be 1,500 to 8,500, 1,500 to 6,500, or 2,000 to 5,500. As the number average molecular weight of the prepolymer satisfies the above range, it is possible to efficiently increase the molecular weight of the polymer in the polycondensation reaction, thereby further enhancing the strength.

The number average molecular weight may be measured using gel permeation chromatography (GPC). Specifically, various data such as Mn, Mw, and Mp may be obtained by gel permeation chromatography. The molecular weight may be measured as a number average molecular weight (Mn) among them.

(b) Preparation of a Polymer

Thereafter, the prepolymer is subjected to a polycondensation reaction to prepare a polymer (S120).

The polycondensation reaction may be carried out at 180° C. to 280° C. and 1.0 Torr or less for 1 hour to 6 hours or 1 hour to 5 hours. For example, the polycondensation reaction may be carried out at 190° C. to 270° C., 210° C. to 260° C., 215° C. to 245° C., or 230° C. to 255° C., at 0.9 Torr or less, 0.7 Torr or less, 0.2 Torr to 1.0 Torr, 0.3 Torr to 0.9 Torr, 0.5 Torr to 0.9 Torr, or 0.4 Torr to 0.6 Torr, for 1.5 hours to 5.5 hours, 2 hours to 5 hours, 1.5 hours to 4.5 hours, 2 hours to 4 hours, 3.5 hours to 4.5 hours, or 2.5 hours to 3.5 hours.

In addition, one or more selected from the group consisting of an additive such as silica, potassium, and magnesium, a stabilizer such as trimethyl phosphate, triphenyl phosphate, trimethyl phosphine, phosphoric acid, and phosphorous acid, and a polymerization catalyst such as antimony trioxide, antimony trioxide, and tetrabutyl titanate may be further added to the prepolymer before the polycondensation reaction.

The polymer may have a number average molecular weight of 4,000 or more. For example, the number average molecular weight of the polymer may be 43,000 or more, 45,000 or more, 40,000 to 70,000, or 50,000 to 70,000. As the number average molecular weight of the polymer satisfies the above range, the strength and processability can be further enhanced.

In addition, the polymer may have an acid value of 1.8 mg KOH/g or less. For example, the acid value of the polymer may be 1.5 mg KOH/g or less, 1.3 mg KOH/g or less, or 1.25 mg KOH/g or less. As the acid value of the polymer satisfies the above range, it is possible to maximize the enhancement of hydrolysis resistance.

(c) Preparation of Pellets

Thereafter, pellets are prepared from the polymer (S130).

Specifically, step S130 may comprise cooling the polymer to 15° C. or lower, 10° C. or lower, or 6° C. or lower, and cutting the cooled polymer to prepare pellets.

The cutting step may be carried out using a pellet cutter without limitations as long as it is commonly used in the art, and the pellets may have various shapes.

(d) Preparation of a Nonwoven Fabric Layer

Thereafter, the pellets are spun to prepare a nonwoven fabric layer.

The spinning may be a melt-blown, spunbond, flash-spun, electro-spinning, or wet-laid method. Melt-blown is preferred from the viewpoint of pore size, but it is not limited thereto.

Specifically, in the melt-blown method, a polymer is spun at a high speed. Since it can produce a nonwoven fabric with a small pore size and high filter performance, it is widely used in hygiene products used in the medical field and electrical products. But it has a problem of large specific surface area and low strength.

However, the process for preparing a biodegradable nonwoven fabric according to the embodiment can produce a nonwoven fabric having excellent strength without deteriorating the biodegradability, flexibility, and processability even using the melt-blown method.

Specifically, in step S130, the pellets may be spun at 160° C. to 260° C., 180° C. to 260° C., 160° C. to 240° C., 185° C. to 240° C., or 190° C. to 230° C. and a spinning rate of 30 m/min to 100 m/min, 30 m/min to 70 m/min, or 70 m/min to 100 m/min to prepare a nonwoven fabric layer.

In addition, step S140 may further comprise coating an antimicrobial composition on at least one side of the nonwoven fabric layer (S141).

Specifically, in step S140, an antimicrobial composition may be coated on at least one side of the nonwoven fabric layer to form an antimicrobial coating layer, to thereby obtain a biodegradable nonwoven fabric comprising a nonwoven fabric layer and an antimicrobial coating layer on at least one side of the nonwoven fabric layer. The coating may be carried out by gravure coating, slot coating, comma coating, roll coating, spray coating, or impregnation coating, but it is not limited thereto.

The antimicrobial composition may comprise silver nanoparticles in an amount of 0.5% by weight to 10% by weight based on the total weight of the antimicrobial composition. For example, the content of silver nanoparticles may be 0.5% by weight to 8% by weight, 0.5% by weight to 3% by weight, 0.7% by weight to 2.5% by weight, or 0.8% by weight to 1.5% by weight, based on the total weight of the antimicrobial composition. As the content of silver nanoparticles satisfies the above range, the antimicrobial characteristics can be further enhanced. In particular, when the biodegradable nonwoven fabric comprising the antimicrobial coating layer is used as a packaging material for food, it is possible to more effectively prevent the deterioration of the food.

Process for Preparing a Biodegradable Polyester Film

In addition, there is provided a process for preparing the biodegradable polyester film according to the embodiment.

The process for preparing a biodegradable polyester film according to an embodiment comprises preparing a composition comprising a diol component comprising 1,4-butanediol or a derivative thereof, a dicarboxylic acid component, and nanocellulose; subjecting the composition to an esterification reaction to prepare a prepolymer; subjecting the prepolymer to a polycondensation reaction to prepare a polymer; preparing pellets from the polymer; and drying and melt-extruding the pellets, wherein the dicarboxylic acid component comprises a first dicarboxylic acid and a second dicarboxylic acid different from the first dicarboxylic acid, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof. The nanocellulose may be employed in an amount of 3% by weight or less based on the total weight of the composition. The film prepared according to the embodiment has a tensile strength of 25 MPa or more and an elongation of 400% or more.

The nanocellulose may comprise one or more selected from the group consisting of (i) bacterial cellulose having a three-dimensional network structure with a diameter of 100 nm or less, (ii) nanocellulose pretreated with a silane coupling agent represented by the following Formula 1, and (iii) nanocellulose having a rate of change in light transmittance of 25% or less according to the following Equation 1.

The process for preparing a biodegradable polyester film according to an embodiment comprises preparing a composition comprising a diol component comprising 1,4-butanediol or a derivative thereof, a dicarboxylic acid component, and bacterial cellulose in a three-dimensional network structure with a diameter of 100 nm or less; subjecting the composition to an esterification reaction to prepare a prepolymer; subjecting the prepolymer to a polycondensation reaction to prepare a polymer; preparing pellets from the polymer; and drying and melt-extruding the pellets, wherein the dicarboxylic acid component comprises a first dicarboxylic acid and a second dicarboxylic acid different from the first dicarboxylic acid, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof.

The process for preparing a biodegradable polyester film according to another embodiment comprises subjecting a composition comprising a diol component comprising 1,4-butanediol or a derivative thereof, a dicarboxylic acid component, and nanocellulose pretreated with a silane coupling agent represented by the above Formula 1 to an esterification reaction to prepare a prepolymer; subjecting the prepolymer to a polycondensation reaction to prepare a polymer; preparing pellets from the polymer; and drying and melt-extruding the pellets, wherein the dicarboxylic acid component comprises a first dicarboxylic acid and a second dicarboxylic acid different from the first dicarboxylic acid, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof.

The process for preparing a biodegradable polyester film according to still another embodiment comprises subjecting a composition comprising a diol component comprising 1,4-butanediol or a derivative thereof, a dicarboxylic acid component, and nanocellulose having a rate of change in light transmittance of 25% or less according to the above Equation 1 to an esterification reaction to prepare a prepolymer; subjecting the prepolymer to a polycondensation reaction to prepare a polymer; preparing pellets from the polymer; and drying and melt-extruding the pellets, wherein the dicarboxylic acid component comprises one or more selected from the group consisting of terephthalic acid, dimethyl terephthalic acid, adipic acid, succinic acid, and derivatives thereof; specifically, the dicarboxylic acid component comprises a first dicarboxylic acid and a second dicarboxylic acid different from the first dicarboxylic acid, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof.

Details on the diol component, the dicarboxylic acid component, and the bacterial cellulose are as described above.

The bacterial cellulose may be cellulose dispersed in the diol component. For example, the diol component may be 1,4-butanediol, and the bacterial cellulose may be one dispersed in 1,4-butanediol. Alternatively, the bacterial cellulose may be cellulose dispersed in water and then redispersed in the diol component. Specifically, the cellulose may be cellulose subjected to dispersion twice as it is dispersed in water and then redispersed in the diol component. As bacterial cellulose dispersed in the same diol component as the diol component employed in the composition, the dispersibility can be further enhanced, resulting in excellent strength characteristics.

A catalyst such as a titanium-based catalyst, a germanium-based catalyst, and an antimony-based catalyst, an additive, and a stabilizer may be added to the composition before the esterification reaction. Details on the catalyst, the additive, and the stabilizer are as described above.

In the step of preparing a prepolymer, it may be prepared by subjecting a composition comprising the diol component, the dicarboxylic acid component, and the nanocellulose to a one-step esterification reaction or to a two-step esterification reaction of a primary esterification reaction and a secondary esterification reaction. If the prepolymer is prepared through the two-step esterification reaction, the nanocellulose may be added in the second esterification reaction step, whereby the binding force of the nanocellulose can be enhanced. Specifically, the addition of the nanocellulose, that is, nanocellulose dispersed in water in the secondary esterification reaction step may further enhance the durability.

In addition, it is preferable to add the nanocellulose at a temperature of 100° C. to 160° C., preferably 110° C. to 140° C., from the viewpoint of the enhancement of hydrolysis resistance. Further, the nanocellulose may be added at a rate of 0.2 kg/min to 0.6 kg/min or 0.3 kg/min to 0.5 kg/min to prevent agglomeration, along with the enhancement of hydrolysis resistance, and to maintain an appropriate process speed. Alternatively, the nanocellulose may be added at a rate of 2 kg/min to 10 kg/min, 2.5 kg/min to 9.5 kg/min, or 3 kg/min to 8 kg/min, to prevent agglomeration with the further enhancement of hydrolysis resistance and to maintain an appropriate process speed.

More specifically, the two-step esterification reaction may comprise (1) subjecting the diol component and the first dicarboxylic acid component to a primary esterification reaction; and (2) adding the diol component, the second dicarboxylic acid component, and the nanocellulose to the reaction product and subjecting them to a secondary esterification reaction.

Other process conditions in the preparation of the prepolymer, the preparation of the polymer, and the preparation of the pellets may be the same as those exemplified in the preparation of the prepolymer (S110), the preparation of the polymer (S120), and the preparation of the pellets (S130) in the process for preparing a biodegradable nonwoven fabric.

Thereafter, the pellets are dried and melt-extruded to prepare a biodegradable polyester film.

The drying may be carried out at 60° C. to 100° C. for 2 hours to 12 hours. Specifically, the drying may be carried out at 65° C. to 95° C., 70° C. to 90° C., or 75° C. to 85° C., for 3 hours to 12 hours or 4 hours to 10 hours. As the drying process conditions of the pellets satisfy the above ranges, it is possible to further enhance the quality of the biodegradable polyester film thus produced.

The melt-extrusion may be carried out at a temperature of 270° C. or lower. For example, the melt-extrusion may be carried out at a temperature of 265° C. or lower, 260° C. or lower, 255° C. or lower, 200° C. to 270° C., 200° C. to 255° C., or 205° C. to 245° C. In addition, the melt-extrusion may be carried out at a pressure of 5 Torr or less. For example, the melt-extrusion may be carried out at a pressure of 4.5 Torr or less or 4 Torr or less. The melt-extrusion may be carried out by a blown film process, but it is not limited thereto.

Process for Preparing a Biodegradable Polyester Resin

The process for preparing a biodegradable polyester resin according to an embodiment comprises subjecting a composition comprising a diol component comprising 1,4-butanediol or a derivative thereof and a dicarboxylic acid component to an esterification reaction to prepare a prepolymer; subjecting the prepolymer to a polycondensation reaction to prepare a polymer; and preparing pellets from the polymer, wherein the dicarboxylic acid component comprises a first dicarboxylic acid and a second dicarboxylic acid different from the first dicarboxylic acid, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof.

The process for preparing a biodegradable polyester resin according to another embodiment further comprises subjecting the pellets to a solid-phase polymerization after the step of preparing the pellets. That is, the process for preparing a biodegradable polyester resin according to the embodiment comprises subjecting a composition comprising a diol component comprising 1,4-butanediol or a derivative thereof and a dicarboxylic acid component to an esterification reaction to prepare a prepolymer; subjecting the prepolymer to a polycondensation reaction to prepare a polymer; preparing pellets from the polymer; and subjecting the pellets to a solid-phase polymerization, wherein the dicarboxylic acid component comprises a first dicarboxylic acid and a second dicarboxylic acid different from the first dicarboxylic acid, the first dicarboxylic acid comprises one or more selected from the group consisting of terephthalic acid, dimethyl terephthalic acid, and derivatives thereof, and the second dicarboxylic acid comprises one or more selected from the group consisting of adipic acid, succinic acid, and derivatives thereof.

In addition, the composition may further comprise the nanocellulose or the catalyst or additive as described above in addition to the diol component and the dicarboxylic acid component. Thus, the biodegradable polyester resin and the process for preparing the same according to the embodiments may be applied to the biodegradable polyester resin composition and the process for preparing the same.

FIG. 8 shows the process of preparing a biodegradable polyester resin according to an embodiment.

Hereinafter, referring to FIG. 8, the process for preparing a biodegradable polyester resin according to an embodiment (S200) will be described.

(a) Preparation of a Prepolymer

First, a composition comprising a diol component comprising 1,4-butanediol or a derivative thereof and a dicarboxylic acid component is subjected to an esterification reaction to prepare a prepolymer (S210).

The prepolymer may have a number average molecular weight of 1,500 to 10,000. For example, the number average molecular weight of the prepolymer may be 1,500 to 8,500, 2,000 to 8,000, 3,500 to 6,000, or 4,500 to 5,500. As the number average molecular weight of the prepolymer satisfies the above range, it is possible to shorten the process time of the solid-state polymerization as a subsequent step and to effectively prevent discoloration of the biodegradable polyester resin thus produced, thereby enhancing the quality.

The prepolymer may have an intrinsic viscosity (IV) of 0.1 dl/g to 0.6 dl/g. For example, the intrinsic viscosity (IV) of the prepolymer may be 0.1 dl/g to 0.55 dl/g, 0.15 to 0.45 dl/g, or 0.15 dl/g to 0.35 dl/g. As the intrinsic viscosity (IV) of the prepolymer satisfies the above range, it is possible to enhance the stability during the distribution of the polyester resin thus produced.

The prepolymer may have a concentration of carboxyl end groups of 25 meq/kg to 50 meq/kg. For example, the concentration of carboxyl end groups in the prepolymer may be 25 meq/kg to 45 meq/kg, 28 meq/kg to 43 meq/kg, or 30 meq/kg to 40 meq/kg. As the concentration of carboxyl end groups in the prepolymer satisfies the above range, it is possible to shorten the process time of the solid-state polymerization as a subsequent step and to enhance the hydrolysis resistance of the polyester resin thus produced.

The prepolymer may have a melt flow index of 15 g/10 min or more under the conditions of 190° C. and 2.1 kg. For example, the melt flow index of the prepolymer may be 18 g/10 min or more, 20 g/10 min or more, 15 g/10 min to 27 g/10 min, 18 g/10 min to 27 g/10 min, or 20 g/10 min to 26 g/10 min, under the conditions of 190° C. and 2.1 kg. As the melt flow index of the prepolymer satisfies the above range, it is possible to shorten the process time of the solid-state polymerization as a subsequent step and to enhance the hydrolysis resistance of the polyester resin thus produced.

Other process conditions in the preparation of the prepolymer may be the same as those exemplified in the preparation of the prepolymer (S110) in the process for preparing the biodegradable nonwoven fabric.

(b) Preparation of a Polymer

Thereafter, the prepolymer is subjected to a polycondensation reaction to prepare a polymer (S220).

The polymer may have a number average molecular weight of 20,000 or more. For example, the number average molecular weight of the polymer may be 23,000 or more, 25,000 or more, 28,000 or more, 20,000 to 100,000, 25,000 to 80,000, or 28,000 to 35,000.

As the number average molecular weight of the polymer satisfies the above range, it is possible to shorten the process time of the solid-state polymerization as a subsequent step and to effectively prevent discoloration of the biodegradable polyester resin thus produced, thereby enhancing the quality.

The polymer may have an intrinsic viscosity (IV) of 0.65 dl/g to 1.3 dl/g. For example, the intrinsic viscosity (IV) of the polymer may be 0.7 dl/g to 1.3 dl/g, 0.75 dl/g to 1.15 dl/g, or 0.85 dl/g to 1.15 dl/g. As the intrinsic viscosity (IV) of the polymer satisfies the above range, it is possible to enhance the stability during the distribution of the polyester resin thus produced.

The polymer may have a concentration of carboxyl end groups of 20 meq/kg to 40 meq/kg. For example, the concentration of carboxyl end groups in the polymer may be 21 meq/kg to 40 meq/kg, 23 meq/kg to 35 meq/kg, or 23 meq/kg to 33 meq/kg. As the concentration of carboxyl end groups in the polymer satisfies the above range, it is possible to shorten the process time of the solid-state polymerization as a subsequent step and to enhance the hydrolysis resistance of the polyester resin thus produced.

The polymer may have a melt flow index of 13 g/10 min or less under the conditions of 190° C. and 2.1 kg. For example, the melt flow index of the polymer may be 11 g/10 min or less, 10 g/10 min or less, 2 g/10 min to 13 g/10 min, or 4 g/10 min to 10 g/10 min, under the conditions of 190° C. and 2.1 kg. As the melt flow index of the polymer satisfies the above range, it is possible to shorten the process time of the solid-state polymerization as a subsequent step and to enhance the hydrolysis resistance of the polyester resin thus produced.

The ratio of the number average molecular weight of the prepolymer to that of the polymer may be 1:8 to 13. For example, the ratio of the number average molecular weight of the prepolymer to that of the polymer may be 1:8 to 12 or 1:8.5 to 11.5.

The ratio of the intrinsic viscosity (IV) of the prepolymer to that of the polymer may be 1:2 to 7. For example, the ratio of the intrinsic viscosity (IV) of the prepolymer to that of the polymer may be 1:2 to 6 or 1:2.5 to 5.5.

The ratio of the concentration of carboxyl end groups of the prepolymer to that of the polymer may be 1.1 to 1.5:1. For example, the ratio of the concentration of carboxyl end groups of the prepolymer to that of the polymer may be 1.1 to 1.4:1, 1.12 to 1.35:1, or 1.12 to 1.3:1.

The ratio of the melt flow index (MFI) of the prepolymer to that of the polymer under the conditions of 190° C. and 2.1 kg may be 1.5 to 3.5:1. For example, the ratio of the melt flow index (MFI) of the prepolymer to that of the polymer under the conditions of 190° C. and 2.1 kg may be 1.8 to 3.2:1, 2 to 3:1, or 2.5 to 2.9:1.

As the ratios of the number average molecular weight, intrinsic viscosity, concentration of carboxyl end groups, and melt flow index of the prepolymer to those of the polymer satisfy the above ranges, it is possible to shorten the process time of the solid-state polymerization as a subsequent step and to enhance the hydrolysis resistance of the biodegradable polyester resin thus produced.

Other process conditions in the preparation of the polymer may be the same as those exemplified in the preparation of the polymer (S120) in the process for preparing the biodegradable nonwoven fabric.

(c) Preparation of Pellets

Thereafter, pellets are prepared from the polymer (S230).

Specifically, step S230 may comprise cooling the polymer to 15° C. or lower, 10° C. or lower, or 6° C. or lower, and cutting the cooled polymer.

The cutting step may be carried out using a pellet cutter without limitations as long as it is commonly used in the art, and the pellets may have various shapes.

(d) Solid-State Polymerization

Finally, the pellets are subjected to a solid-state polymerization to prepare a biodegradable polyester resin (S240).

The solid-state polymerization may be carried out in a temperature range from the glass transition temperature (Tg) to the melting point (Tm). Specifically, the solid-state polymerization may be carried out in a temperature range from the glass transition temperature (Tg) to the melting point (Tm) of the polymer. The closer to the melting point, the more preferable, but it is not limited thereto.

Specifically, the solid-state polymerization may be carried out for 3 hours to 20 hours at 80° C. to 150° C. and 3 Torr or less in a nitrogen atmosphere. For example, the solid-state polymerization may be carried out for 3 hours to 18 hours, 3 hours to 15 hours, or 3 hours to 12 hours, at a temperature of 85° C. to 200° C., 90° C. to 180° C., or 95° C. to 150° C., and a pressure of 2.5 Torr or less or 1.5 Torr or less in a nitrogen atmosphere. As the process conditions of the solid-state polymerization satisfy the above ranges, it is possible to further enhance the lifespan and durability, in particular, hydrolysis resistance of the biodegradable polyester film thus produced.

In addition, the solid-state polymerization may be a primary solid-state polymerization. Specifically, the solid-state polymerization is a primary solid-state polymerization. If the intrinsic viscosity (IV) of the biodegradable polyester resin prepared upon the primary solid-state polymerization is less than 1.0 dl/g, a secondary solid-state polymerization may be further carried out (S241).

More specifically, the intrinsic viscosity (IV) of the biodegradable polyester resin prepared upon the primary solid-state polymerization is measured. If the intrinsic viscosity (IV) thus measured is less than 1.0 dl/g or less than 0.9 dl/g, a secondary solid-state polymerization may be further carried out for 3 hours to 30 hours or 4 hours to 24 hours at a temperature of 80° C. to 150° C., 85° C. to 200° C., 90° C. to 180° C., or 95° C. to 150° C., and a pressure of 2.5 Torr or less or 1.5 Torr or less.

As the process for preparing a biodegradable polyester resin according to the embodiment comprises the step of subjecting the pellets formed from a composition comprising a specific diol component and a specific dicarboxylic acid component to a solid-state polymerization, the process time is shorter than that of the conventional process in which a chain extender or a deactivator is used, the side reactions can be effectively suppressed, and the molecular weight and the concentration of carboxyl end groups can be efficiently adjusted.

Accordingly, the process can enhance all of the biodegradability, hydrolysis resistance, lifespan, strength, durability, and processability of the polyester resin prepared, whereby it is possible to provide a biodegradable polyester resin having excellent durability, processability, and stability during distribution without discoloration.

The biodegradable polyester resin may have a number average molecular weight of 50,000 or more. For example, the number average molecular weight of the biodegradable polyester resin may be 52,000 or more, 53,000 or more, 50,000 to 150,000, 52,000 to 130,000, or 53,000 to 120,000.

As the number average molecular weight of the biodegradable polyester resin satisfies the above range, the mechanical properties such as strength, in particular, tear strength can be further enhanced.

The biodegradable polyester resin may have an intrinsic viscosity (IV) of 1.2 dl/g or more. For example, the intrinsic viscosity (IV) of the biodegradable polyester resin may be 1.22 dl/g or more, 1.25 dl/g or more, 1.2 dl/g to 5 dl/g, 1.2 dl/g to 3.5 dl/g, 1.2 dl/g to 3 dl/g, or 1.25 dl/g to 2.5 dl/g. As the intrinsic viscosity of the biodegradable polyester resin satisfies the above range, the hydrolysis resistance can be further enhanced.

The biodegradable polyester resin may have a concentration of carboxyl end groups of 25 meq/kg or less. For example, the concentration of carboxyl end groups of the polymer may be 23 meq/kg or less, 20 meq/kg or less, 1 meq/kg to 25 meq/kg, 5 meq/kg to 20 meq/kg, or 8 meq/kg to 20 meq/kg. As the concentration of carboxyl end groups of the biodegradable polyester resin satisfies the above range, the hydrolysis resistance can be maximized. Therefore, the durability and stability during distribution can be further enhanced.

The biodegradable polyester resin may have a melt flow index of 3.9 g/10 min or less under the conditions of 190° C. and 2.1 kg. For example, the melt flow index of the biodegradable polyester resin may be 3.8 g/10 min or less, 3.5 g/10 min or less, 3.3 g/10 min or less, 3.1 g/10 min or less, 0.1 g/10 min to 3.9 g/10 min, 0.1 g/10 min to 3.8 g/10 min, 0.3 g/10 min to 3.5 g/10 min, 0.5 g/10 min to 3.5 g/10 min, 1.2 g/10 min to 3.3 g/10 min, 1.5 g/10 min to 3.3 g/10 min, or 1.8 g/10 min to 3.1 g/10 min. As the melt flow index of the biodegradable polyester resin satisfies the above range, the hydrolysis resistance can be further enhanced.

The ratio of the number average molecular weight of the polymer to that of the biodegradable polyester resin may be 1:1.5 to 2.5. For example, the ratio of the number average molecular weight of the polymer to that of the biodegradable polyester resin may be 1:1.6 to 2.5 or 1:1.7 to 2.4.

The ratio of the intrinsic viscosity (IV) of the polymer to that of the biodegradable polyester resin may be 1:1 to 2. For example, the ratio of the intrinsic viscosity (IV) of the polymer to that of the biodegradable polyester resin may be 1:1.1 to 1.9 or 1:1.2 to 1.8.

The ratio of the concentration of carboxyl end groups of the polymer to that of the biodegradable polyester resin may be 1.4 to 4:1. For example, the ratio of the concentration of carboxyl end groups of the polymer to that of the biodegradable polyester resin may be 1.4 to 3.8:1 or 1.45 to 3.5:1.

The ratio of the melt flow index of the polymer to that of the biodegradable polyester resin under the conditions of 190° C. and 2.1 kg may be 2 to 6:1. For example, the ratio of the melt flow index of the polymer to that of the biodegradable polyester resin under the conditions of 190° C. and 2.1 kg may be 2.3 to 6:1, 2.5 to 5.8:1, or 2.8 to 5.5:1.

In addition, a sample prepared from the biodegradable polyester resin may have a rate of change in tensile strength before and after a PCT (pressure cooker test) of 20% or less. It may have a yellow index upon the PCT of 3.5 or less. Specifically, when a sample prepared from the biodegradable polyester resin is subjected to a PCT, the rate of change in tensile strength before and after it may be 18% or less, 5% to 20%, or 8% to 18%. In addition, the yellow index of a sample prepared from the biodegradable polyester resin upon the PCT may be 3 or less or 2.8 or less.

The PCT is, for example, a test to measure a rate of change in tensile strength that is measured using a tensile strength meter (Instron) before and after a temperature of 80° C. and a humidity of 100% are maintained for 24 hours in an autoclave. It may be used for evaluating durability, stability during distribution, and lifespan characteristics.

Molded Article

The molded article according to an embodiment may be prepared from the biodegradable polyester resin or resin composition according to the embodiments.

Specifically, the molded article may be prepared by molding the biodegradable polyester resin or resin composition by a method known in the art such as extrusion and injection. The molded article may be an injection molded article, an extrusion molded article, a thin layer molded article, or a blown molded article, but it is not limited thereto.

For example, the biodegradable polyester resin or resin composition may be melt-extruded to prepare a biodegradable polyester film or sheet, wherein the melt-extrusion may be carried out at 270° C. or less, 250° C. or less, or 240° C. or less, but it is not limited thereto.

In addition, the molded article may be in the form of a film or sheet that can be used as agricultural mulching films, disposable gloves, food packaging materials, garbage bags, in the form of a fiber that can be used as fabrics, knitted fabrics, nonwoven fabrics, ropes, or in the form of a container that can be used as a container for food packaging such as a lunch box.

In particular, since the molded article is formed from the biodegradable polyester resin or resin composition that can enhance the strength, processability, as well as, particularly, hydrolysis resistance, it can show excellent properties when applied as a packaging material for electronic products and parts or a packaging material for food.

In particular, the molded article is prepared from the biodegradable polyester resin or resin composition, which can enhance the transparency, strength, and processability, as well as, particularly, biodegradability, strength characteristics such as tensile strength and impact strength, durability such as hydrolysis resistance, and biocompatibility. Thus, it can show excellent properties when applied to medical devices or packaging materials, packaging materials for products stored and transported at low temperatures, automotive interior materials that require durability, or garbage bags, mulching films, and disposable products that require durability and elongation.

MODE FOR THE INVENTION

The above will be described in more detail through various embodiments below, but the embodiments are not limited to the scope described below.

A. Preparation and Evaluation of a Biodegradable Nonwoven Fabric

Preparation Example A1-1

1.4 moles of 1,4-butanediol, 0.5 mole of adipic acid, and 0.5 mole of dimethyl terephthalic acid were mixed. 300 ppm of tetrabutyl titanate (manufacturer: CAMEO Chemicals) as a titanium-based catalyst was added to the mixture. The mixture was then subjected to an esterification reaction at 220° C. and atmospheric pressure to prepare a prepolymer having a number average molecular weight of 5,000.

100 ppm of tetrabutyl titanate (manufacturer: CAMEO Chemicals) as a polycondensation catalyst was added to the prepolymer. The temperature was raised to 240° C., followed by a polycondensation reaction at 0.5 Torr for 3 hours. Polymer A having a number average molecular weight of 50,000 was prepared, which was cooled to 5° C. and cut with a pellet cutter to prepare pellets.

The pellets were melt-extruded at 220° C. and spun at a spinning rate of 50 m/min using a melt-blown method to prepare a nonwoven fabric layer having an average pore size of 150 μm and a thickness of 0.2 mm.

An antimicrobial coating composition containing silver nanoparticles in an amount of 1% by weight was spin-coated on one side of the nonwoven fabric layer to prepare a biodegradable nonwoven fabric having a thickness of 0.2 mm in which an antimicrobial coating layer was formed on one side of the nonwoven fabric layer.

Preparation Example A1-2

A biodegradable nonwoven fabric was prepared in the same manner as in Preparation Example A1-1, except that 0.1% by weight of nanocellulose (a diameter of 20 nm and a length of 200 nm) dispersed in 1,4-butanediol was further added during the polycondensation reaction.

Preparation Example A1-3

A biodegradable nonwoven fabric was prepared in the same manner as in Preparation Example A1-1, except that 0.5% by weight of nanocellulose (a diameter of 20 nm and a length of 200 nm) dispersed in 1,4-butanediol was further added during the polycondensation reaction.

Preparation Example A2-1

A biodegradable nonwoven fabric was prepared in the same manner as in Preparation Example A1-1, except that a polylactic acid resin (4032D, manufacturer: NatureWorks) was used instead of polymer A and that an antimicrobial coating layer was not formed.

Preparation Example A2-2

A biodegradable nonwoven fabric was prepared in the same manner as in Preparation Example A1-1, except that Polymer B obtained by compounding a polylactic acid resin (4032D, manufacturer: NatureWorks) and a polypropylene (manufacturer: Hanwha Total) at 190° C. using twin screws was used instead of polymer A and that an antimicrobial coating layer was not formed.

Evaluation Example A1: Tensile Strength, Elongation, and Initial Elastic Modulus A nonwoven fabric sample was cut to a length of 100 mm and a width of 15 mm. According to ASTM D882, it was set in a universal testing machine (UTM; 4206-001) of INSTRON such that the distance between chucks was 50 mm. Tensile strength and initial elastic modulus were measured at a tensile speed of 100 mm/min, and elongation at break was measured at a tensile speed of 500 mm/min.

Evaluation Example A2: Tear Strength

A nonwoven fabric sample was cut according to KPS M 1001-0806. The maximum load applied until the sample was broken at a constant rate of 500 mm/min was measured. Tear strength was calculated according to the following equation.

$$\text{Tear strength (N/cm)} = \frac{\text{Maximum load until breakage (N)}}{\text{Thickness of specimen (cm)}}$$

Evaluation Example A3: Antimicrobial Activity

It was evaluated as Pass or Fail by the parallel section line method, an antimicrobial test method for textile materials under KS K0890.

Evaluation Example A4: Fisheye

The number of defects such as foreign matters or deteriorated matters of 100 μm or larger in an area of 100 mm². of a nonwoven fabric was counted with a microscope.

Evaluation Example A4: Biodegradability

The biodegradability of a nonwoven fabric sample was calculated by measuring the amount of carbon dioxide generated according to KS M3100-1. Specifically, an inoculum container having compost only manufactured in a compost factory was prepared. A test container in which a sample in 5% by weight of the dry weight of the compost had been added was prepared. Thereafter, they were cultivated for 180 days under the conditions of a temperature of 58±2° C., a moisture content of 50%, and an oxygen concentration of 6% or more. Carbon dioxide generated in each container was collected and titrated with an aqueous solution of phenolphthalein to measure the amount of carbon dioxide. The biodegradability was calculated from the measured amount of generated carbon dioxide according to the following equation.

Biodegradability (%)={(amount of $CO_2$ generated in the test container)−(amount of $CO_2$ generated in the inoculum container)}/(theoretical amount of $CO_2$ to be generated in the test container)×100

B. Preparation and Evaluation of a Biodegradable Polyester Film

Preparation Example B1-1

1.3 moles of 1,4-butanediol, 0.5 mole of adipic acid, and 0.5 mole of dimethyl terephthalic acid were mixed to obtain Mixture A. Added thereto were 0.1% by weight of bacterial cellulose (diameter: 50 nm, crystallinity: 89%, diffraction angles (2θ): 14.6° and) 22.6° dispersed in 1,4-butanediol and 300 ppm of tetrabutyl titanate (manufacturer: CAMEO Chemicals) as a titanium-based catalyst. The mixture was then subjected to an esterification reaction at 220° C. and atmospheric pressure to prepare a prepolymer having a number average molecular weight of 2,000.

100 ppm of tetrabutyl titanate (manufacturer: CAMEO Chemicals) as a polycondensation catalyst was added to the prepolymer. The temperature was raised to 240° C., followed by a polycondensation reaction at 0.5 Torr for 3 hours, to prepare a polymer having a number average molecular weight of 50,000, which was cooled to 5° C. and cut with a pellet cutter to prepare pellets.

The pellets were dried at 80° C. for 5 hours and then melt-extruded at 210° C. using a blown film extruder (Blown Film Extrusion Line, manufacturer: Eugene Engineering) at a rate of 50 m/min to prepare a biodegradable polyester film having a thickness of 20 μm.

Preparation Example B1-2

A biodegradable polyester film was prepared in the same manner as in Preparation Example B1-1, except that Mixture B obtained by mixing 1.5 moles of 1,4-butanediol, 0.4 mole of succinic acid, and 0.5 mole of dimethyl terephthalic acid was used instead of Mixture A and that 0.1% by weight of bacterial cellulose (diameter: 30 nm, crystallinity: 89%,

TABLE 1

|  | Prep. Ex. A1-1 | Prep. Ex. A1-2 | Prep. Ex. A1-3 | Prep. Ex. A2-1 | Prep. Ex. A2-2 |
| --- | --- | --- | --- | --- | --- |
| Tensile strength (MPa) | 35 | 50 | 47 | 37 | 28 |
| Elongation (%) | 600 | 700 | 800 | 200 | 150 |
| Initial elastic modulus (kgf/mm²) | 100 | 150 | 190 | 350 | 240 |
| Tear strength (N/cm) | 600 | 1,000 | 1,100 | 200 | 300 |
| Antimicrobial activity | Pass | Pass | Pass | Fail | Fail |
| Fisheye (count) | — | — | — | — | 30 |
| Biodegradability (%) | 90 | 90 | 90 | 90 | 40 |

As shown in Table 1, the biodegradable nonwoven fabrics of Preparation Examples A1-1 to A1-3 were superior to the biodegradable nonwoven fabrics of Preparation Examples A2-1 and A2-2 in terms of biodegradability, tensile strength, tear strength, elongation, initial elastic modulus, and antimicrobial.

Specifically, the biodegradable nonwoven fabrics of Preparation Examples A1-1 to A1-3 were superior to the biodegradable nonwoven fabrics of Preparation Examples A2-1 and A2-2 in terms of biodegradability, tensile strength, tear strength, and elongation; thus, they can be readily applied to various products. In addition, the biodegradable nonwoven fabrics of Preparation Examples A1-1 to A1-3 had no dent defects such as fisheyes and were excellent in flexibility thanks to their low initial elastic modulus. They were excellent in texture or wearing comfort when applied to products.

diffraction angles (2θ): 14.6° and 22.6°) was further added thereto.

Preparation Example B2-1

A biodegradable polyester film was prepared in the same manner as in Preparation Example B1-1, except that bacterial cellulose was not added and that Mixture C obtained by mixing 0.9 mole of 1,4-butanediol, 0.5 mole of adipic acid, and 0.5 mole of dimethyl terephthalic acid was used instead of Mixture A to prepare a polymer having a number average molecular weight of 30,000.

Preparation Example B2-2

PBAT (manufacturer: JinHui, China), PLA (4032D, manufacturer: NatureWork), and an acrylic impact modifier (AIM5000, manufacturer: Dongyang Materials Industry) were mixed at a weight ratio of 80:15:5 and compounded at 230° C. using twin screws to prepare a polymer.

The polymer was melt-extruded at 220° C. using a blown film extruder (Blown Film Extrusion Line, manufacturer: Eugene Engineering) at a rate of 50 m/min to prepare a biodegradable film having a thickness of 20 μm.

Preparation Example B2-3

A porous structure with a large surface area in which cellulose nanofibers (width: 500 nm, length: 10 μm) were randomly positioned was obtained by the electrospinning method. 0.1% by weight of the porous structure of cellulose was added to PBAT (manufacturer: JinHui, China), which were compounded at 230° C. using twin screws to prepare a polymer.

The polymer was melt-extruded at 190° C. using a blown film extruder (Blown Film Extrusion Line, manufacturer: Eugene Engineering) at a rate of 50 m/min to prepare a biodegradable film having a thickness of 20 μm.

Preparation Example B2-4

1.3 moles of 1,4-butanediol, 0.5 mole of adipic acid, and 0.5 mole of dimethyl terephthalic acid were mixed to obtain a mixture. 0.1% by weight of microfibrous cellulose (diameter: 200 nm, length: 8 μm, crystallinity: 61%, diffraction angles (2θ): 16.5° and 22.2°) dispersed in 1,4-butanediol and 300 ppm of tetrabutyl titanate (manufacturer: CAMEO Chemicals) as a titanium-based catalyst were added thereto. The mixture was then subjected to an esterification reaction at 220° C. and atmospheric pressure to prepare a prepolymer having a number average molecular weight of 2,000.

The microfibrous cellulose was prepared by treating plant-based cellulose by a physical method (high-speed homogenizer).

100 ppm of tetrabutyl titanate (manufacturer: CAMEO Chemicals) as a polycondensation catalyst was added to the prepolymer. The temperature was raised to 250° C., followed by a polycondensation reaction at 0.5 Torr for 3 hours, to prepare a polymer having a number average molecular weight of 40,000, which was cooled to 5° C. and cut with a pellet cutter to prepare pellets.

The pellets were dried at 80° C. for 5 hours and then melt-extruded at 240° C. using a blown film extruder (Blown Film Extrusion Line, manufacturer: Eugene Engineering) at a rate of 50 m/min to prepare a biodegradable film having a thickness of 20 μm.

Evaluation Example B1: Tensile Strength

A film sample was cut to a length of 100 mm and a width of 15 mm. According to ASTM D882, it was set in a universal testing machine (UTM; 4206-001) of INSTRON such that the distance between chucks was 50 mm. Tensile strength was measured at a tensile speed of 100 mm/min.

Evaluation Example B2: Unit Impact Absorption Energy

It was measured in accordance with the provisions of ASTM D3420 using a film impact tester manufactured by Toyoseiki. A hemispherical shape having a diameter of 1 inch was used as the pendulum tip, and a film sample was set on the sample stand having a circular hole with a diameter of about 50 mm. The impact absorption energy (kgf-cm) thus measured was divided by the thickness (μm) of the film sample to calculate the unit shock absorption energy (kgf-cm/μm). Here, each sample was measured 10 times to obtain an average value.

Evaluation Example B3: Biodegradability

The biodegradability was measured for a film sample in the same manner as in Evaluation Example A5.

TABLE 2

| | Tensile strength (MPa) | Unit impact absorption energy (kgf-cm/μm) | Biodegradability (%) |
|---|---|---|---|
| Preparation Example B1-1 | 50 | 1.0 | 90% |
| Preparation Example B1-2 | 58 | 1.3 | 90% |
| Preparation Example B2-1 | 30 | 0.3 | 90% |
| Preparation Example B2-2 | 40 | 0.7 | 85% |
| Preparation Example B2-3 | 20 | 0.4 | 90% |
| Preparation Example B2-4 | 42 | 0.8 | 90% |

As shown in Table 2, the biodegradable polyester films of Preparation Examples B1-1 and B1-2 were superior to the biodegradable polyester films of Preparation Examples B2-1 to B2-4 in terms of tensile strength, unit impact absorption energy, and biodegradability.

Specifically, the biodegradable polyester films of Preparation Examples B1-1 and B1-2 in which bacterial cellulose having a specific diameter was used were excellent in tensile strength and unit impact absorption energy, so that they had excellent strength and durability, particularly impact resistance. In addition, since they were also excellent in biodegradability, they can be readily applied to medical devices or packaging materials.

In particular, the biodegradable polyester films of Preparation Examples B1-1 and B1-2 were superior to that of Preparation Examples B2-3 in which nanocellulose was used and that of B2-4 in which plant-based cellulose was used in terms of tensile strength, unit impact absorption energy, and biodegradability.

C. Preparation and Evaluation of a Biodegradable Polyester Film

Preparation Example C1-1

60 parts by mole of 1,4-butanediol and 50 parts by mole of dimethyl terephthalic acid were mixed. 200 ppm of tetrabutyl titanate (manufacturer: Aldrich) as a titanium-based catalyst was added thereto. The mixture was then subjected to a primary esterification reaction at 210° C. and atmospheric pressure for 2 hours.

40 parts by mole of 1,4-butanediol and 50 parts by mole of adipic acid were further mixed with the reaction product. 0.2% by weight of nanocellulose pretreated with a silane coupling agent represented by the following Formula 1-1 and 200 ppm of tetrabutyl titanate (manufacturer: Aldrich) as a titanium-based catalyst were added thereto. The mixture was then subjected to a secondary esterification reaction at 210° C. and atmospheric pressure to prepare a prepolymer having a number average molecular weight of 5,000.

The pretreated nanocellulose was obtained by mixing 5% by weight of a silane coupling agent with cellulose nanocrystals (diameter: 50 nm, length: 150 nm, crystallinity 88%) based on the total weight of the nanocellulose.

200 ppm of tetrabutyl titanate (manufacturer: Aldrich) as a polycondensation catalyst was added to the prepolymer. The temperature was raised to 240° C., followed by a polycondensation reaction at 0.8 Torr for 4 hours, to prepare a polymer having a number average molecular weight of 50,000, which was cooled to 5° C. and cut with a pellet cutter to prepare pellets.

The pellets were dried at 80° C. for 5 hours and then melt-extruded at 210° C. using a blown film extruder (Blown Film Extrusion Line, manufacturer: Eugene Engineering) at a rate of 50 m/min to prepare a biodegradable polyester film having a thickness of 20 μm.

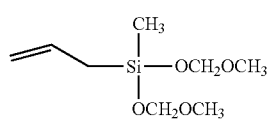

[Formula 1-1]

Preparation Example C1-2

A biodegradable polyester film was prepared in the same manner as in Preparation Example C1-1, except that 50 parts by mole of 1,4-butanediol and 50 parts by mole of dimethyl terephthalic acid were used instead of 60 parts by mole of 1,4-butanediol and 50 parts by mole of dimethyl terephthalic acid and that 50 parts by mole of 1,4-butanediol and 50 parts by mole of succinic acid were used instead of 40 parts by mole of 1,4-butanediol and 50 parts by mole of adipic acid.

Preparation Example C2-1

PBAT (Ecoworld, manufacturer: JinHui) and PLA (4032D, manufacturer: NatureWork) were mixed at a weight ratio of 90:10 and extruded at 220° C. using twin screws to prepare a polymer. It was cooled to 5° C. and cut with a pellet cutter to prepare pellets. The pellets were dried and melt-extruded in the same manner as in Preparation Example C1-1 to prepare a biodegradable polyester film.

Preparation Example C2-2

0.3% by weight of an epoxy-based chain extender (ADR 4368, manufacturer: BASF) was added to PBAT (Ecoworld, manufacturer: JinHui), which was extruded at 230° C. using twin screws to prepare a polymer. It was cooled to 5° C. and cut with a pellet cutter to prepare pellets. The pellets were dried and melt-extruded in the same manner as in Preparation Example C1-1 to prepare a biodegradable polyester film.

Preparation Example C2-3

50 parts by mole of 1,4-butanediol and 40 parts by mole of dimethyl terephthalic acid were mixed. 400 ppm of tetrabutyl titanate (manufacturer: Aldrich) as a titanium-based catalyst was added to the mixture. The mixture was then subjected to a primary esterification reaction at 230° C. and atmospheric pressure for 1 hour.

40 parts by mole of 1,4-butanediol and 50 parts by mole of adipic acid were further mixed with the reaction product. 0.2% by weight of nanocrystals (diameter: 50 nm, length: 150 nm, crystallinity 88%) and 200 ppm of tetrabutyl titanate (manufacturer: Aldrich) as a titanium-based catalyst were added thereto. The mixture was then subjected to a secondary esterification reaction at 210° C. and atmospheric pressure for 2 hours to prepare a prepolymer having a number average molecular weight of 5,000.

200 ppm of tetrabutyl titanate (manufacturer: Aldrich) as a polycondensation catalyst was added to the prepolymer. The temperature was raised to 240° C., followed by a polycondensation reaction at 0.8 Torr for 4 hours, to prepare a polymer having a number average molecular weight of 50,000, which was cooled to 5° C. and cut with a pellet cutter to prepare pellets.

The pellets were dried at 80° C. for 5 hours and then melt-extruded at 210° C. using a blown film extruder (Blown Film Extrusion Line, manufacturer: Eugene Engineering) at a rate of 50 m/min to prepare a biodegradable polyester film having a thickness of 20 μm.

Evaluation Example C1: Tensile Strength and Rate of Change in Tensile Strength

A film sample was cut to a length of 100 mm and a width of 15 mm. According to ASTM D882, it was set in a universal testing machine (UTM; 4206-001) of INSTRON such that the distance between chucks was 50 mm. Tensile strength was measured at a tensile speed of 100 mm/min.

The tensile strength was measured after it was stored in a chamber at a temperature of 25° C. and a humidity of 50% R.H for 6 months using the above method. The rate of change in tensile strength was calculated from the tensile strength before and after the storage.

Evaluation Example C2: Tear Strength

The tear strength was measured for a film sample in the same manner as in Evaluation Example A2.

Evaluation Example C3: Elongation

A film sample was cut to a length of 100 mm and a width of 15 mm. The maximum deformation immediately before breakage was measured at a rate of 500 mm/min using a universal testing machine (UTM; 4206-001) of INSTRON. Elongation was calculated as the ratio of the maximum deformation to the initial length.

Evaluation Example C4: Acid Value

The biodegradable polyester resin, which is a polymer obtained during the procedure for preparing the biodegradable polyester film, was dissolved in dichloromethane and titrated with an ethyl alcohol solution of 0.1 N potassium hydroxide to measure an acid value.

Evaluation Example C5: Biodegradability

The biodegradability was measured for a film sample in the same manner as in Evaluation Example A5.

TABLE 3

| | Prep. Ex. C1-1 | Prep. Ex. C1-2 | Prep. Ex. C2-1 | Prep. Ex. C2-2 | Prep. Ex. C2-3 |
|---|---|---|---|---|---|
| Tensile strength (MPa) | 50 | 55 | 36 | 33 | 42 |
| Rate of change in Tensile strength (%) | 25 | 20 | 35 | 40 | 33 |
| Tear strength (N/cm) | 1,100 | 850 | 500 | 650 | 650 |
| Elongation (%) | 900 | 700 | 500 | 800 | 900 |
| Acid value (mg KOH/g) | 1.1 | 1.2 | 2.7 | 3 | 2 |
| Biodegradability (%) | 90% | 90% | 90% | 90% | 90% |

As shown in Table 3, the biodegradable polyester film of Preparation Example C1-1 was superior to the biodegradable polyester films of Preparation Examples C2-1 to C2-3 in terms of biodegradability, tensile strength, rate of change in tensile strength, tear strength, elongation, and acid value.

Specifically, the biodegradable polyester film of Preparation Example C1-1 prepared from a biodegradable polyester resin having a lower acid value than those of Preparation Examples C2-1 to C2-3 was excellent in biodegradability, tensile strength, rate of change in tensile strength, and elongation, so that they can be readily applied to various fields.

D. Preparation and Evaluation of a Biodegradable Polyester Film

Preparation Example D1-1

(1) Preparation of Pretreated Nanocellulose

Cellulose nanocrystal (CNC) in the form of a dry powder having a particle size of 1 μm to 50 μm was dispersed in water at a concentration of 1% by weight, which was subjected to ultrasonic treatment using a tip-type ultrasonic disperser (NVC-100, manufacturer: Celluforce) for 15 minutes at an energy dose of 20,000 J to prepare pretreated nanocellulose.

(2) Preparation of a Biodegradable Polyester Film 50 parts by mole of 1,4-butanediol and 50 parts by mole of dimethyl terephthalic acid were mixed. 200 ppm of tetrabutyl titanate (manufacturer: Aldrich) as a titanium-based catalyst was added to the mixture. The mixture was then subjected to a primary esterification reaction at 210° C. and atmospheric pressure for 2 hours.

50 parts by mole of 1,4-butanediol and 50 parts by mole of adipic acid were further mixed with the reaction product. 0.1% by weight of the pretreated nanocellulose obtained in step (1) and 150 ppm of tetrabutyl titanate (manufacturer: Aldrich) as a titanium-based catalyst were added thereto. The mixture was then subjected to a secondary esterification reaction at 210° C. and atmospheric pressure for 2 hours to prepare a prepolymer having a number average molecular weight of 5,000.

200 ppm of tetrabutyl titanate (manufacturer: Aldrich) as a polycondensation catalyst was added to the prepolymer. The temperature was raised to 240° C., followed by a polycondensation reaction at 0.5 Torr for 4 hours, to prepare a polymer having a number average molecular weight of 50,000, which was cooled to 5° C. and cut with a pellet cutter to prepare pellets.

The pellets were dried at 80° C. for 5 hours and then melt-extruded at 160° C. using a blown film extruder (Blown Film Extrusion Line, manufacturer: Eugene Engineering) at a rate of 50 m/min to prepare a biodegradable polyester film having a thickness of 20 μm.

Preparation Example D1-2

(1) Preparation of Pretreated Nanocellulose

Cellulose nanocrystal (CNC) in the form of a dry powder having a particle size of 1 μm to 50 μm was dispersed in water at a concentration of 2% by weight, which was subjected to bead mill treatment using zirconium beads having a diameter of 0.5 mm for 30 minutes at a filling rate of 85% and a linear speed of 15 m/sec. Thereafter, it was subjected to ultrasonic treatment using a tip-type ultrasonic disperser (HD 4400, manufacturer: K Corporation) for 15 minutes at an energy dose of 10,000 J to prepare pretreated nanocellulose.

(2) Preparation of a Biodegradable Polyester Film 50 parts by mole of 1,4-butanediol and 50 parts by mole of dimethyl terephthalic acid were mixed. 200 ppm of tetrabutyl titanate (manufacturer: Aldrich) as a titanium-based catalyst was added to the mixture. The mixture was then subjected to a primary esterification reaction at 210° C. and atmospheric pressure for 2 hours.

50 parts by mole of 1,4-butanediol and 50 parts by mole of succinic acid were further mixed with the reaction product. 0.2% by weight of the pretreated nanocellulose obtained in step (1) and 150 ppm of tetrabutyl titanate (manufacturer: Aldrich) as a titanium-based catalyst were added thereto. The mixture was then subjected to a secondary esterification reaction at 210° C. and atmospheric pressure for 2 hours to prepare a prepolymer having a number average molecular weight of 4,000.

150 ppm of tetrabutyl titanate (manufacturer: Aldrich) as a polycondensation catalyst was added to the prepolymer. The temperature was raised to 250° C., followed by a polycondensation reaction at 0.8 Torr for 3 hours, to prepare a polymer having a number average molecular weight of 55,000, which was cooled to 5° C. and cut with a pellet cutter to prepare pellets.

The pellets were dried at 80° C. for 5 hours and then melt-extruded at 160° C. using a blown film extruder (Blown Film Extrusion Line, manufacturer: Eugene Engineering) at a rate of 50 m/min to prepare a biodegradable polyester film having a thickness of 20 μm.

Preparation Example D1-3

(1) Preparation of Pretreated Nanocellulose

Cellulose nanocrystal (CNC) in the form of a dry powder having a particle size of 1 μm to 50 μm was dispersed in water at a concentration of 1% by weight, which was subjected to bead mill treatment using zirconium beads having a diameter of 0.5 mm for 2 hours at a filling rate of 85% and a linear speed of 15 msec to prepare pretreated nanocellulose.

(2) Preparation of a Biodegradable Polyester Film 100 parts by mole of 1,4-butanediol and 100 parts by mole of succinic acid were mixed. 300 ppm of tetrabutyl titanate (manufacturer: Aldrich) as a titanium-based catalyst was added to the mixture. The mixture was then subjected to an esterification reaction at 220° C. and atmospheric pressure for 3 hours to prepare a prepolymer having a number average molecular weight of 5,000. During the esterification reaction, 0.1% by weight of the pretreated nanocellulose obtained in step (1) was added.

250 ppm of tetrabutyl titanate (manufacturer: Aldrich) as a polycondensation catalyst was added to the prepolymer. The temperature was raised to 250° C., followed by a polycondensation reaction at 0.5 Torr for 4 hours, to prepare a polymer having a number average molecular weight of 55,000, which was cooled to 5° C. and cut with a pellet cutter to prepare pellets.

The pellets were dried at 80° C. for 5 hours and then melt-extruded at 160° C. using a blown film extruder (Blown Film Extrusion Line, manufacturer: Eugene Engineering) at a rate of 50 m/min to prepare a biodegradable polyester film having a thickness of 20 μm.

Preparation Example D2-1

(1) Preparation of Pretreated Nanocellulose

Cellulose nanocrystal (CNC) in the form of a dry powder having a particle size of 1 μm to 50 μm was dispersed in water at a concentration of 2% by weight, which was stirred using a stirrer (NCV-100, manufacturer: Celluforce) at 8,000 rpm for 1 hour to prepare pretreated nanocellulose.

(2) Preparation of a Biodegradable Polyester Film 50 parts by mole of 1,4-butanediol and 50 parts by mole of dimethyl terephthalic acid were mixed. 200 ppm of tetrabutyl titanate (manufacturer: Aldrich) as a titanium-based catalyst was added to the mixture. The mixture was then subjected to a primary esterification reaction at 210° C. and atmospheric pressure for 2 hours.

50 parts by mole of 1,4-butanediol and 50 parts by mole of succinic acid were further mixed with the reaction product. 0.3% by weight of the pretreated nanocellulose obtained in step (1) and 250 ppm of tetrabutyl titanate (manufacturer: Aldrich) as a titanium-based catalyst were added thereto. The mixture was then subjected to a secondary esterification reaction at 220° C. and atmospheric pressure for 2 hours to prepare a prepolymer having a number average molecular weight of 4,000.

150 ppm of tetrabutyl titanate (manufacturer: Aldrich) as a polycondensation catalyst was added to the prepolymer. The temperature was raised to 250° C., followed by a polycondensation reaction at 0.8 Torr for 3 hours, to prepare a polymer having a number average molecular weight of 55,000, which was cooled to 5° C. and cut with a pellet cutter to prepare pellets.

The pellets were dried at 80° C. for 5 hours and then melt-extruded at 160° C. using a blown film extruder (Blown Film Extrusion Line, manufacturer: Eugene Engineering) at a rate of 50 m/min to prepare a biodegradable polyester film having a thickness of 20 μm.

Preparation Example D2-2

(1) Preparation of Pretreated Nanocellulose

Cellulose nanocrystal (CNC) in the form of a dry powder having a particle size of 1 μm to 50 μm was dispersed in water at a concentration of 1% by weight, which was subjected to ultrasonic treatment using a tip-type ultrasonic disperser (HD 4400, manufacturer: K Corporation) for 30 minutes at an energy dose of 50,000 J to prepare pretreated nanocellulose.

(2) Preparation of a Biodegradable Polyester Film 50 parts by mole of 1,4-butanediol and 50 parts by mole of dimethyl terephthalic acid were mixed. 200 ppm of tetrabutyl titanate (manufacturer: Aldrich) as a titanium-based catalyst was added to the mixture. The mixture was then subjected to a primary esterification reaction at 210° C. and atmospheric pressure for 2 hours. 50 parts by mole of 1,4-butanediol and 50 parts by mole of adipic acid were further mixed with the reaction product. 0.2% by weight of the pretreated nanocellulose obtained in step (1) and 250 ppm of tetrabutyl titanate (manufacturer: Aldrich) as a titanium-based catalyst were added thereto. The mixture was then subjected to a secondary esterification reaction at 220° C. and atmospheric pressure for 2 hours to prepare a prepolymer having a number average molecular weight of 4,000.

350 ppm of tetrabutyl titanate (manufacturer: Aldrich) as a polycondensation catalyst was added to the prepolymer. The temperature was raised to 250° C., followed by a polycondensation reaction at 0.8 Torr for 3 hours, to prepare a polymer having a number average molecular weight of 45,000, which was cooled to 5° C. and cut with a pellet cutter to prepare pellets.

The pellets were dried at 80° C. for 5 hours and then melt-extruded at 160° C. using a blown film extruder (Blown Film Extrusion Line, manufacturer: Eugene Engineering) at a rate of 50 m/min to prepare a biodegradable polyester film having a thickness of 20 μm.

Preparation Example D2-3

(1) Preparation of Pretreated Nanocellulose

Cellulose nanocrystal (CNC) in the form of a dry powder having a particle size of 1 μm to 50 μm was dispersed in water at a concentration of 1% by weight, which was subjected to bead mill treatment using zirconium beads having a diameter of 1.5 mm for 1 hour at a filling rate of 50% and a linear speed of 25 msec to prepare pretreated nanocellulose.

(2) Preparation of a Biodegradable Polyester Film 50 parts by mole of 1,4-butanediol and 50 parts by mole of dimethyl terephthalic acid were mixed. 200 ppm of tetrabutyl titanate (manufacturer: Aldrich) as a titanium-based catalyst was added to the mixture. The mixture was then subjected to a primary esterification reaction at 210° C. and atmospheric pressure for 2 hours.

50 parts by mole of 1,4-butanediol and 50 parts by mole of adipic acid were further mixed with the reaction product. 0.2% by weight of the pretreated nanocellulose obtained in step (1) and 250 ppm of tetrabutyl titanate (manufacturer: Aldrich) as a titanium-based catalyst were added thereto. The mixture was then subjected to a secondary esterification reaction at 210° C. and atmospheric pressure for 2 hours to prepare a prepolymer having a number average molecular weight of 4,000.

150 ppm of tetrabutyl titanate (manufacturer: Aldrich) as a polycondensation catalyst was added to the prepolymer. The temperature was raised to 250° C., followed by a polycondensation reaction at 0.8 Torr for 3 hours, to prepare a polymer having a number average molecular weight of 45,000, which was cooled to 5° C. and cut with a pellet cutter to prepare pellets.

The pellets were dried at 80° C. for 5 hours and then melt-extruded at 160° C. using a blown film extruder (Blown Film Extrusion Line, manufacturer: Eugene Engineering) at a rate of 50 m/min to prepare a biodegradable polyester film having a thickness of 20 μm.

Preparation Example D2-4

A biodegradable polyester film was prepared in the same manner as in Preparation Example D1-3, except that an acetal-based engineering plastic ball was used instead of the zirconium beads.

Evaluation Example D1: Particle Size and Particle Size Deviation

The pretreated nanocellulose prepared in step (1) of Preparation Examples D1-1 to D2-4 was subjected to measurement of particle size and particle size deviation through dynamic light scattering (DLS) at a temperature of 25° C. and a measurement angle of 175° using Zetasizer Nano ZS (manufacturer: Marven). Here, the value at the peak derived through the polydispersity index (PDI) at a confidence interval of 0.5 was measured as the particle size, and the particle size deviation was calculated through the maximum and minimum values obtained by scanning 15 times.

Evaluation Example D2: Rate of Change in Light Transmittance

An aqueous dispersion was prepared in which the pretreated nanocellulose obtained in step (1) of Preparation Examples D1-1 and D1-3 and Preparation Examples D2-2 and D2-4 was dispersed at a concentration of 1% by weight, respectively. An aqueous dispersion was prepared in which the pretreated nanocellulose obtained in step (1) of Preparation Example D1-2 and Preparation Examples D2-1 and D2-3 was dispersed at a concentration of 2% by weight, respectively.

The aqueous dispersions were each subjected to measurement for the rate of change in light transmittance for 12 hours at a temperature of 30° C. and a wavelength of 850 nm using Terviscan (Manufacturer: Formulaction). The rate of change in light transmittance was calculated according to the following Equation 1. Here, it was measured in the upper layer of the container in which the aqueous dispersion was contained. The upper layer refers to a portion from the top to a position that is ⅓ of the total height of the container in which the aqueous dispersion was contained.

$$\text{Rate of change in light transmittance (\%)} = \frac{|LT1 - LT2|}{LT1} \times 100 \quad \text{[Equation 1]}$$

In Equation 1, LT1 is a first light transmittance (%) of an aqueous dispersion in which the nanocellulose is dispersed in an amount of 0.1% by weight to 5% by weight, when measured under the conditions of a temperature of 30° C. and a wavelength of 850 nm, and LT2 is a second light transmittance (%) measured after 12 hours under the same conditions.

Evaluation Example D3: Tensile Strength and Deviation of Tensile Strength

The film samples prepared in step (2) of Preparation Example D1-1 to D2-4 were each cut to a length of 100 mm and a width of 15 mm. According to ASTM D882, it was set in a universal testing machine (UTM; 4206-001) of INSTRON such that the distance between chucks was 50 mm. Tensile strength was measured at a tensile speed of 100 mm/min.

In addition, the film samples prepared in step (2) of Preparation Examples D1-1 to D1-3 and Preparation Examples D2-1 to D2-4 were each cut to 30 sheets, each of which had a length of 50 cm and a width of 15 cm according to ASTM D882. The deviation of tensile strength measured at any position within the area was calculated in the same manner as above.

Evaluation Example D4: Tear Strength

The tear strength was measured for the film samples obtained in Preparation Example D1-1 to D2-4 in the same manner as in Evaluation Example A2.

Evaluation Example D5: Elongation

The film samples obtained in step (2) of Preparation Example D1-1 to D2-4 were each cut to a length of 100 mm and a width of 15 mm. The maximum deformation immediately before breakage was measured at a rate of 500 mm/min using a universal testing machine (UTM; 4206-001) of INSTRON. Elongation was calculated as the ratio of the maximum deformation to the initial length.

Evaluation Example D6: Sealing Strength

The film samples obtained in step (2) of Preparation Example D1-1 to D2-4 were each cut to a length of 100 mm and a width of 15 mm. Two sample sheets cut in this way were placed in contact with each other and thermally bonded at 120° C. under a heat gradient of 40 psi/sec. Then, the maximum stress was measured during peeling at a speed of 300 mm/min at an angle of 180° using a peel tester to obtain the sealing strength.

Evaluation Example D7: Biodegradability

The biodegradability was measured for a film sample in the same manner as in Evaluation Example A5.

TABLE 4

|  | Prep. Ex. D1-1 | Prep. Ex. D1-2 | Prep. Ex. D1-3 | Prep. Ex. D2-1 | Prep. Ex. D2-2 | Prep. Ex. D2-3 | Prep. Ex. D2-4 |
| --- | --- | --- | --- | --- | --- | --- | --- |
| Particle size | 180 nm | 150 nm | 160 nm | 25 μm | 13 μm | 1 μm | 45 μm |
| Particle size deviation (%) | 15 | 9 | 13 | 30 | 25 | 25 | 30 |
| LT1 (%) | 26.0 | 11.0 | 22.0 | 40.3 | 38.0 | 31.5 | 50.8 |
| LT2 (%) | 30.9 | 12.7 | 26.2 | 52.4 | 49.4 | 40.9 | 68.6 |
| Rate of change in light transmittance (%) | 18.8 | 15.5 | 19.1 | 30.0 | 30.0 | 30.0 | 35.0 |

TABLE 4-continued

|  | Prep. Ex. D1-1 | Prep. Ex. D1-2 | Prep. Ex. D1-3 | Prep. Ex. D2-1 | Prep. Ex. D2-2 | Prep. Ex. D2-3 | Prep. Ex. D2-4 |
|---|---|---|---|---|---|---|---|
| Tensile strength (MPa) | 49 | 50 | 51 | 39 | 41 | 40 | 36 |
| Tensile strength deviation (%) | 6 | 3 | 5 | 10 | 13 | 18 | 18 |
| Tear strength (N/cm) | 1,150 | 1,000 | 800 | 900 | 950 | 800 | 750 |
| Elongation (%) | 750 | 750 | 700 | 600 | 700 | 700 | 650 |
| Sealing strength (gf) | 1,000 | 900 | 900 | 1,000 | 1,100 | 1,100 | 900 |
| Biodegradability (%) | 90% | 90% | 90% | 90% | 90% | 90% | 90% |

As shown in Table 4, the biodegradable polyester films of Preparation Examples D1-1 to D1-3 were superior to the biodegradable polyester films of Preparation Examples D2-1 to D2-4 in terms of biodegradability, tensile strength, tensile strength deviation, tear strength, elongation, and sealing strength.

Specifically, the biodegradable polyester films of Preparation Examples D1-1 to D1-3 prepared from the biodegradable polyester resin containing nanocellulose according to the embodiment were excellent in biodegradability, tensile strength, tear strength, elongation, and sealing strength, so that they can be readily applied to various fields.

E. Preparation and Evaluation of a Biodegradable Polyester Resin

Preparation Example E1-1

1.3 moles of 1,4-butanediol, 0.5 mole of adipic acid, and 0.5 mole of dimethyl terephthalic acid were mixed to prepare Mixture A. 400 ppm of tetrabutyl titanate (manufacturer: CAMEO Chemicals) as a titanium-based catalyst was added to the mixture. The mixture was then subjected to an esterification reaction at 210° C. and atmospheric pressure to prepare a prepolymer having a number average molecular weight of 3,000.

100 ppm of tetrabutyl titanate (manufacturer: CAMEO Chemicals) as a polycondensation catalyst was added to the prepolymer. The temperature was raised to 220° C., followed by a polycondensation reaction at 0.5 Torr for 3 hours, to prepare a polymer having a number average molecular weight of 30,000, which was cooled to 5° C. and cut with a pellet cutter to prepare pellets.

The pellets were charged to a solid-state polymerization reactor (vacuum tumbler reactor, trade name: Batch SSP, manufacturer: Roschermatic) and subjected to a solid-state polymerization at 105° C. and 1 Torr in a nitrogen atmosphere under vacuum for 10 hours to prepare a biodegradable polyester resin.

Preparation Example E1-2

A biodegradable polyester resin was prepared in the same manner as in Preparation Example E1-1, except that the solid-state polymerization was carried out at 108° C. for 24 hours.

Preparation Example E1-3

A biodegradable polyester resin was prepared in the same manner as in Preparation Example E1-1, except that Mixture B obtained by mixing 1.5 moles of 1,4-butanediol, 0.5 mole of succinic acid, and 0.6 mole of dimethyl terephthalic acid was used instead of Mixture A.

Preparation Example E2-1

1.3 moles of 1,4-butanediol, 0.5 mole of adipic acid, and 0.5 mole of dimethyl terephthalic acid were mixed to prepare Mixture C. 100 ppm of tetrabutyl titanate (manufacturer: CAMEO Chemicals) as a titanium-based catalyst was added to the mixture. The mixture was then subjected to an esterification reaction at 210° C. and atmospheric pressure to prepare a prepolymer having a number average molecular weight of 3,000.

100 ppm of tetrabutyl titanate (manufacturer: CAMEO Chemicals) as a polycondensation catalyst was added to the prepolymer. The temperature was raised to 220° C., followed by a polycondensation reaction at 0.5 Torr for 3 hours, to prepare a polymer having a number average molecular weight of 30,000.

Phosphorous acid as a deactivator was further added to the polymer, and the temperature was raised to 190° C. The reaction was terminated after 2 hours to prepare a biodegradable polyester resin.

Preparation Example E2-2

1.3 moles of 1,4-butanediol, 0.5 mole of adipic acid, and 0.5 mole of dimethyl terephthalic acid were mixed to prepare Mixture D. 200 ppm of tetrabutyl titanate (manufacturer: CAMEO Chemicals) as a titanium-based catalyst was added to the mixture. The mixture was then subjected to an esterification reaction at 210° C. and atmospheric pressure to prepare a prepolymer having a number average molecular weight of 3,000.

100 ppm of tetrabutyl titanate (manufacturer: CAMEO Chemicals) as a polycondensation catalyst was added to the prepolymer. The temperature was raised to 220° C., followed by a polycondensation reaction at 0.5 Torr for 3 hours, to prepare a polymer having a number average molecular weight of 49,000.

0.3% by weight of an epoxy-based chain extender (ADR 4368, manufacturer: Joncryl) was added to the polymer. Then, the polymer was compounded using twin screws at 260° C., which was cooled to 5° C. to prepared a biodegradable polyester resin.

Evaluation Example E1: Number Average Molecular Weight

The prepolymer (a), polymer (b), and biodegradable polyester resin (c) were each dissolved in tetrahydrofuran (THF) and then subjected to measurement using gel permeation chromatography (GPC). Various data such as Mn, Mw, and Mp may be obtained by gel permeation chromatography. The molecular weight was measured as a number average molecular weight (Mn) among them.

Evaluation Example E2: Concentration of Carboxyl End Groups

Each of the prepolymer (a), polymer (b), and biodegradable polyester resin (c) in an amount of 1 g was completely dissolved in 20 ml of o-cresol and dilute with 50 ml of chloroform. After an indicator was added thereto, it was titrated with a sodium hydroxide/methanol solution.

Evaluation Example E3: Intrinsic Viscosity (IV)

Each of the prepolymer (a), polymer (b), and biodegradable polyester resin (c) in an amount of 2 g was completely dissolved in 25 ml of chloroform and then subjected to measurement using a viscometer (Canon Viscometer).

Evaluation Example E4: Melt Flow Index (MFI)

The melt flow index (MFI) was measured with a device (manufacturer: Tinus Olsen) under the conditions of 190° C. and 2.1 kg.

Evaluation Example E5: Pressure Cooker Test (PCT)

The biodegradable polyester resins were each melt-extruded at 220° C. and molded using extrusion blown film equipment (Model SJ-D50, Manufacturer: SANBI) at a rate of 50 m/min to prepare a biodegradable polyester film.

The film was placed in an autoclave, and PCT (pressure cooker test) was carried out to maintain a temperature of 80° C. and a humidity of 100% for 24 hours.

The rate of change in tensile strength before and after the PCT was evaluated using a tensile strength measuring instrument (manufacturer: Instron). The yellow index (YI) after performing the PCT was measured using a spectrophotometer (manufacturer: Intertek) according to ASTM E313.

Evaluation Example E6: Biodegradability

The biodegradability was measured for the biodegradable polyester resins in the same manner as in Evaluation Example A5.

As shown in Table 5, the biodegradable polyester resins of Preparation Examples E1-1 to E1-3 were superior to the biodegradable polyester resins of Preparation Examples E2-1 and E2-2 in terms of concentration of carboxyl end groups, intrinsic viscosity, melt flow index, and biodegradability. In addition, the films prepared from the biodegradable polyester resins of Preparation Examples E1-1 to E1-3 had a lower yellowness than that of the films prepared from the resins of Preparation Examples E2-1 and E2-2.

Specifically, the biodegradable polyester resins of Preparation Examples E1-1 to E1-3 had a lower concentration of carboxyl end groups and a lower intrinsic viscosity than those of the resins of Preparation Examples E2-1 and E2-2 in which a deactivator and a chain extender were used. They were excellent in biodegradability and relatively low in melt flow index, so that they were excellent in hydrolysis resistance.

The invention claimed is:

1. A biodegradable polyester resin composition, which comprises a diol component comprising 1,4-butanediol, a dicarboxylic acid component, and nanocellulose in an amount of 0.001% by weight to 0.2% by weight based on the total weight of the biodegradable polyester resin composition,
   wherein the dicarboxylic acid component comprises a first dicarboxylic acid and a second dicarboxylic acid different from the first dicarboxylic acid,
   wherein the first dicarboxylic acid comprises one or more selected from the group consisting of terephthalic acid, and dimethyl terephthalic acid,
   wherein the second dicarboxylic acid comprises one or more selected from the group consisting of adipic acid, and succinic acid,
   wherein the molar ratio of the diol component and the dicarboxylic acid component is 1 to 2:1,
   wherein the molar ratio of the first dicarboxylic acid and the second dicarboxylic acid is 0.5 to 2:1,
   wherein the biodegradability of the biodegradable polyester resin composition is 85% or more, and
   wherein the nanocellulose is dispersed in the diol component.

2. The biodegradable polyester resin composition of claim 1, which has a tensile strength of 25 MPa or more when it is melt-extruded at 160° C. to 240° C., processed at a rate of

TABLE 5

|  |  | Prep. Ex. E1-1 | Prep. Ex. E1-2 | Prep. Ex. E1-3 | Prep. Ex. E2-1 | Prep. Ex. E2-2 |
|---|---|---|---|---|---|---|
| Number average molecular weight | a | 3,000 | 3,000 | 3,000 | 3,000 | 3,000 |
|  | b | 30,000 | 30,000 | 30,000 | 30,000 | 49,000 |
|  | c | 55,000 | 70,000 | 60,000 | 45,000 | 51,000 |
| Concentration of carboxyl end groups (meq/kg) | a | 35 | 35 | 31 | 31 | 37 |
|  | b | 30 | 30 | 25 | 41 | 35 |
|  | c | 19 | 10 | 15 | 30 | 45 |
| Intrinsic viscosity (IV) | a | 0.2 | 0.2 | 0.3 | 0.2 | 0.2 |
|  | b | 1.0 | 1.0 | 0.9 | 0.9 | 1.0 |
|  | c | 1.3 | 1.5 | 1.4 | 0.9 | 1.1 |
| Melt flow index (g/10 min) | a | 25 | 25 | 22 | 28 | 28 |
|  | b | 9 | 9 | 8 | 9 | 7 |
|  | c | 3.0 | 2.0 | 2.5 | 7.0 | 4.0 |
| PCT Rate of change in tensile strength (%) |  | 15 | 10 | 17 | 30 | 33 |
| Yellow index |  | 2.5 | 1.5 | 2.0 | 4.0 | 4.3 |
| Biodegradability (%) |  | 90 | 90 | 90 | 90 | 90 |

50 m/min to form a blown film having a thickness of 20 μm, and measured at a speed of 100 mm/min in accordance with ASTM D882, or which has a tensile strength of 25 MPa or more when it is melt-extruded at 220° C., spun at a rate of 50 m/min to form a nonwoven film having a thickness of 0.2 mm, and measured at a speed of 100 mm/min in accordance with ASTM D882.

3. The biodegradable polyester resin composition of claim 1, which has an elongation of 400% or more when it is melt-extruded at 160° C. to 240° C., processed at a rate of 50 m/min to form a blown film having a thickness of 20 μm, and measured at a speed of 500 mm/min in accordance with ASTM D882, or which has an elongation of 400% or more when it is melt-extruded at 220° C., spun at a rate of 50 m/min to form a nonwoven film having a thickness of 0.2 mm, and measured at a speed of 500 mm/min in accordance with ASTM D882.

4. The biodegradable polyester resin composition of claim 1, wherein the nanocellulose comprises one or more selected from the group consisting of bacterial cellulose, nanocellulose pretreated with a silane coupling agent, and nanocellulose with adjusted light transmittance.

5. The biodegradable polyester resin composition of claim 4, wherein the nanocellulose comprises one or more selected from the group consisting of:
 (i) bacterial cellulose having a three-dimensional network structure with a diameter of 100 nm or less,
 (ii) nanocellulose pretreated with a silane coupling agent represented by the following Formula 1, and
 (iii) nanocellulose having a rate of change in light transmittance of 25% or less according to the following Equation 1:

[Formula 1]

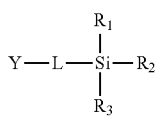

in Formula 1, Y is an organic functional group, L is an alkylene group or an arylene group, $R_1$ is an alkyl group, and $R_2$ and $R_3$ are each independently a hydrolyzable group, $$\text{Rate of change in light transmittance (\%)} = \frac{|LT1 - LT2|}{LT1} \times 100 \quad \text{[Equation 1]}$$

in Equation 1, LT1 is a first light transmittance (%) of an aqueous dispersion in which the nanocellulose is dispersed in an amount of 0.1% by weight to 5% by weight, when measured under the conditions of a temperature of 30° C. and a wavelength of 850 nm, and LT2 is a second light transmittance (%) measured after 12 hours under the same conditions.

6. A biodegradable polyester nonwoven fabric, which comprises the biodegradable polyester resin composition according to claim 2.

7. A biodegradable polyester film, which comprises the biodegradable polyester resin composition according to claim 2.

8. A process for preparing a biodegradable polyester nonwoven fabric or film, which comprises:
 preparing a composition comprising a diol component comprising 1,4-butanediol, a dicarboxylic acid component, and nanocellulose in an amount of 3% by weight or less based on the total weight of the composition;
 subjecting the composition to an esterification reaction to prepare a prepolymer;
 subjecting the prepolymer to a polycondensation reaction to prepare a polymer;
 preparing pellets from the polymer;;
 solid-phase polymerizing the pellets, wherein the solid-phase polymerizing comprises performing a primary solid-phase polymerization to prepare a polyester resin with an intrinsic viscosity (IV) of less than 1.0 dl/g, and performing a secondary solid-phase polymerization on the polyester resin; and
 melt-extruding and spinning the pellets to prepare a nonwoven fabric layer or melt-extruding the pellets to prepare a blown film,
 wherein the dicarboxylic acid component comprises a first dicarboxylic acid and a second dicarboxylic acid different from the first dicarboxylic acid, the first dicarboxylic acid comprises one or more selected from the group consisting of terephthalic acid, and dimethyl terephthalic acid, the second dicarboxylic acid comprises one or more selected from the group consisting of adipic acid, and succinic acid, and
 the nonwoven fabric layer or the film has a tensile strength of 25 MPa or more and an elongation of 400% or more.

9. A process for preparing a biodegradable polyester resin, which comprises:
 subjecting a composition comprising a diol component comprising 1,4-butanediol and a dicarboxylic acid component to an esterification reaction to prepare a prepolymer;
 subjecting the prepolymer to a polycondensation reaction to prepare a polymer;
 preparing pellets from the polymer; and
 subjecting the pellets to a solid-phase polymerization,
 wherein the solid-phase polymerization comprises performing a primary solid-phase polymerization to prepare a polyester resin with an intrinsic viscosity (IV) of less than 1.0 dl/g, and performing a secondary solid-phase polymerization,
 wherein the dicarboxylic acid component comprises a first dicarboxylic acid and a second dicarboxylic acid different from the first dicarboxylic acid,
 the first dicarboxylic acid comprises one or more selected from the group consisting of terephthalic acid, and dimethyl terephthalic acid,
 the second dicarboxylic acid comprises one or more selected from the group consisting of adipic acid, and succinic acid, and
 the solid-phase polymerization is carried out at a temperature range from the glass transition temperature (Tg) to the melting point (Tm), or carried out at 80° C. to 150° C. and 3 Torr or less under a nitrogen atmosphere for 3 to 20 hours.

10. A biodegradable polyester nonwoven fabric, which comprises the biodegradable polyester resin composition according to claim 3.

11. A biodegradable polyester film, which comprises the biodegradable polyester resin composition according to claim 3.

* * * * *